US011467366B2

(12) United States Patent
Tang et al.

(10) Patent No.: US 11,467,366 B2
(45) Date of Patent: *Oct. 11, 2022

(54) IMAGING LENS ASSEMBLY, CAMERA MODULE, ELECTRONIC DEVICE AND EXTERNAL ADJUSTING JIG FOR MANUFACTURING SAME IMAGING LENS ASSEMBLY

(71) Applicant: LARGAN PRECISION CO., LTD., Taichung (TW)

(72) Inventors: Hsiang-Chi Tang, Taichung (TW); Ming-Ta Chou, Taichung (TW); Ruei-Yang Luo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 181 days.

This patent is subject to a terminal disclaimer.

(21) Appl. No.: 16/931,581

(22) Filed: Jul. 17, 2020

(65) Prior Publication Data

US 2020/0348482 A1  Nov. 5, 2020

Related U.S. Application Data

(63) Continuation of application No. 16/180,112, filed on Nov. 5, 2018, now Pat. No. 10,754,119.

(30) Foreign Application Priority Data

Dec. 26, 2017 (TW) .................................. 106145767

(51) Int. Cl.
*G02B 7/02* (2021.01)
*H04N 5/225* (2006.01)
*G02B 13/00* (2006.01)

(52) U.S. Cl.
CPC ............ *G02B 7/022* (2013.01); *G02B 7/025* (2013.01); *G02B 13/001* (2013.01); *H04N 5/2254* (2013.01)

(58) Field of Classification Search
CPC ...... G02B 7/022; G02B 7/025; G02B 13/001; G02B 7/023; G02B 7/08; H04N 5/2254; G03B 17/12
See application file for complete search history.

(56) References Cited

U.S. PATENT DOCUMENTS 7,468,848 B2  12/2008  Shimizu et al.
7,663,812 B2   2/2010  Chang
(Continued)

*Primary Examiner* — James C. Jones
(74) *Attorney, Agent, or Firm* — McClure, Qualey & Rodack, LLP

(57) ABSTRACT

An imaging lens assembly has an optical axis and includes a plastic barrel, a lens set and a retaining element. The plastic barrel includes a first channel and a second channel. The lens set is disposed in the plastic barrel and includes at least one adjustable lens element, wherein an outer diameter surface of the adjustable lens element includes a plurality of axial rotation structures, each of the axial rotation structures is in a protruding strip shape, and at least one of the axial rotation structures is disposed correspondingly to the second channel of the plastic barrel and exposed. The retaining element is disposed in the plastic barrel and includes an anti-releasing structure, which is disposed correspondingly to the first channel of the plastic barrel to avoid the lens set being released from the plastic barrel.

17 Claims, 24 Drawing Sheets

(56) References Cited

U.S. PATENT DOCUMENTS

| | | |
|---|---|---|
| 7,746,576 B2 | 6/2010 | Lee |
| 7,880,984 B2 | 2/2011 | Yen |
| 7,986,475 B2 | 7/2011 | Lin et al. |
| 8,248,718 B2 | 8/2012 | Yen |
| 10,754,119 B2 * | 8/2020 | Tang .................... G02B 13/001 |
| 2016/0085046 A1 | 3/2016 | Kim |
| 2017/0123178 A1 | 5/2017 | Wang et al. |
| 2017/0123179 A1 | 5/2017 | Wang et al. |
| 2017/0176705 A1 | 6/2017 | Wang et al. |

* cited by examiner

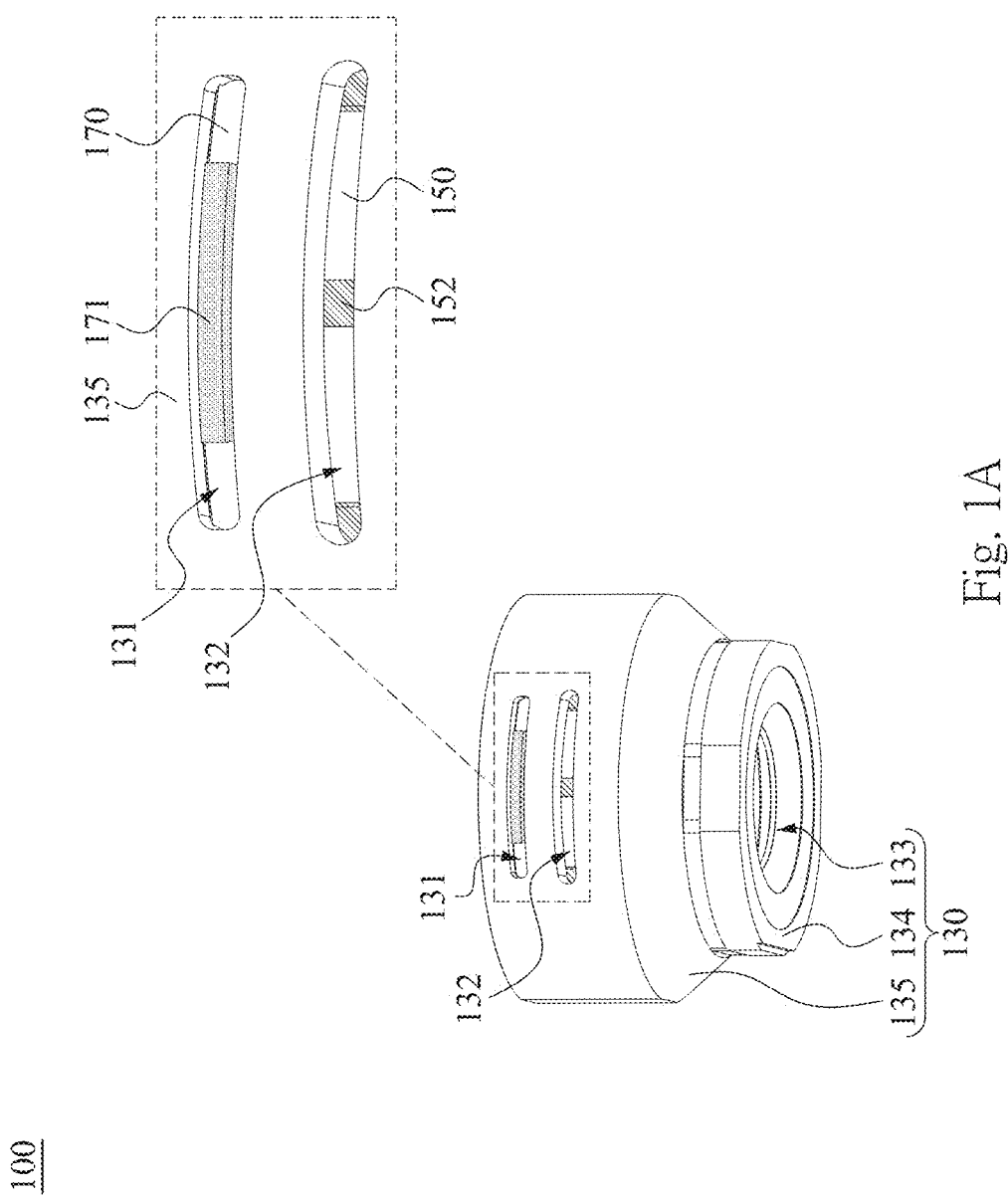

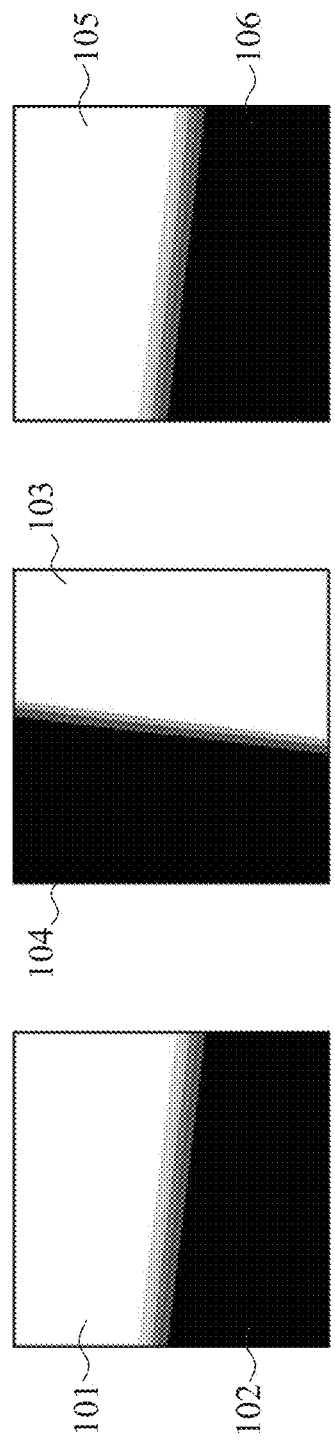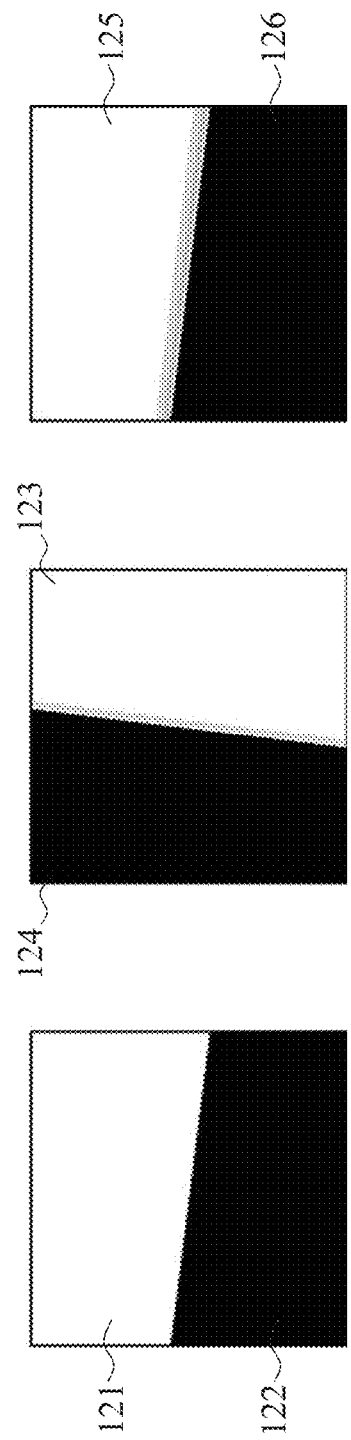

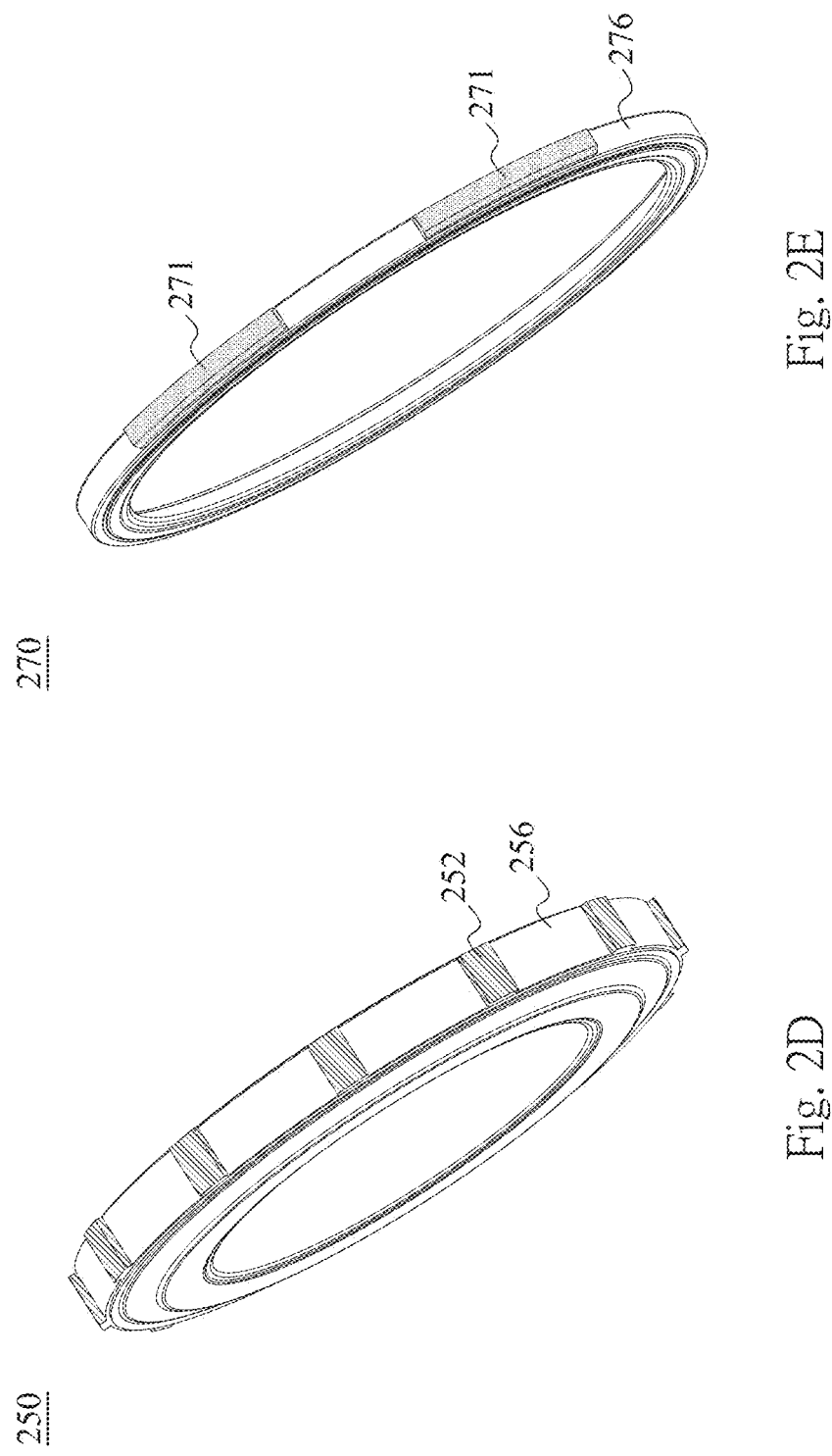

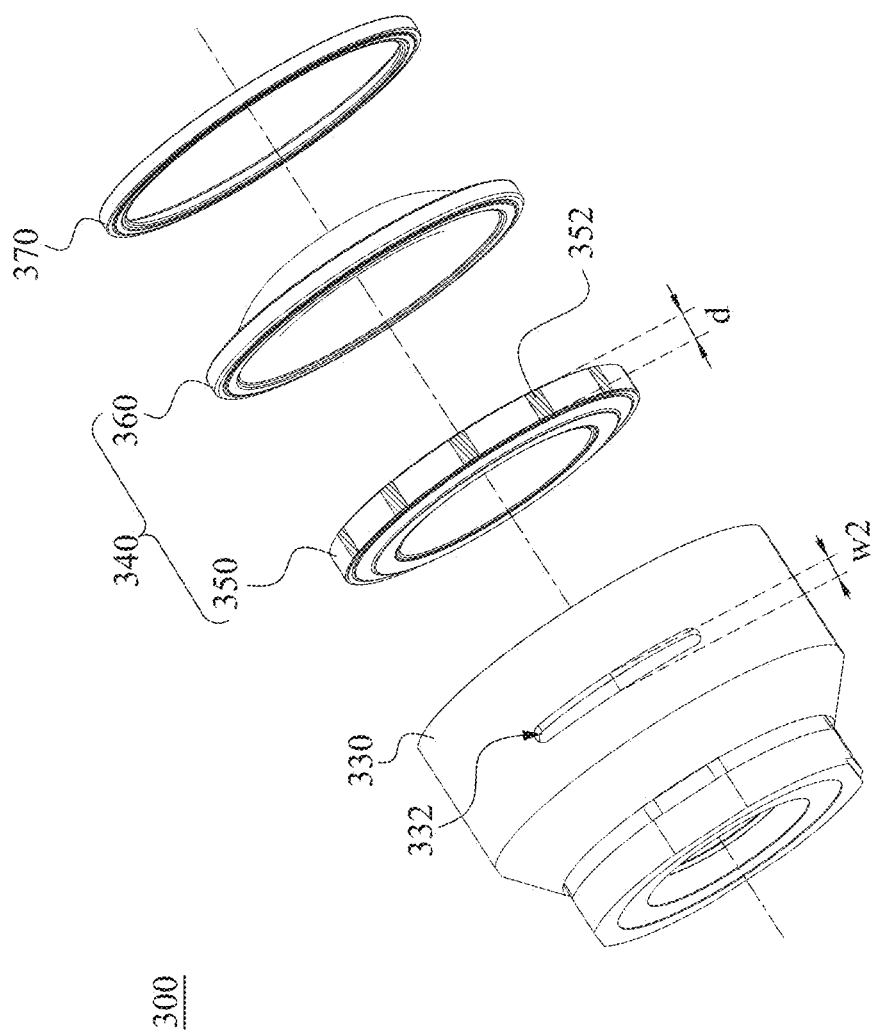

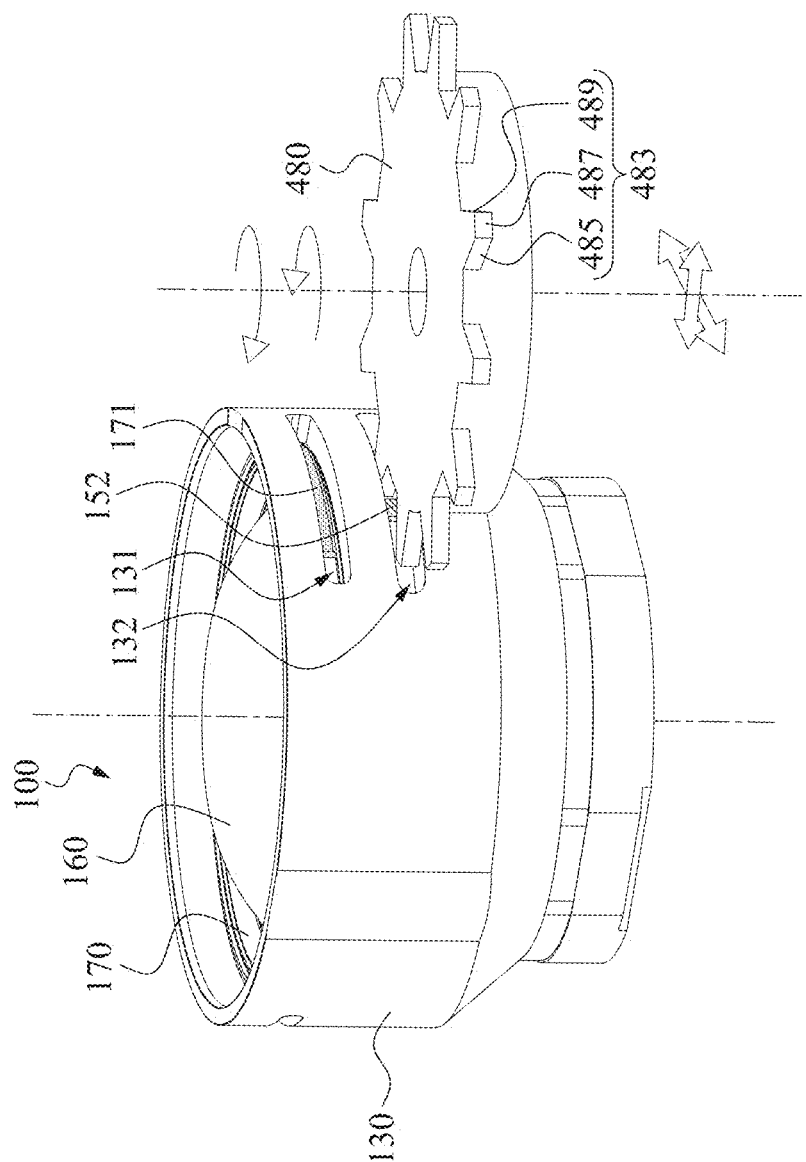

IMAGING LENS ASSEMBLY, CAMERA MODULE, ELECTRONIC DEVICE AND EXTERNAL ADJUSTING JIG FOR MANUFACTURING SAME IMAGING LENS ASSEMBLY

RELATED APPLICATIONS

The present application is a continuation of the application Ser. No. 16/180,112, filed Nov. 5, 2018, U.S. Pat. No. 10,754,119, issued on Aug. 25, 2020, which claims priority to Taiwan Application Serial Number 106145767, filed Dec. 26, 2017, which is herein incorporated by reference.

BACKGROUND

Technical Field

The present disclosure relates to an imaging lens assembly, a camera module, an electronic device and an external adjusting jig for manufacturing the imaging lens assembly. More particularly, the present disclosure relates to an imaging lens assembly and a camera module which are applicable to portable electronic devices, and an external adjusting jig for manufacturing the imaging lens assembly.

Description of Related Art

With widespread utilizations of imaging lens assemblies in different fields, applications in various smart electronic devices such as embedded automobile devices, identification systems, entertainment devices, sports devices and smart home systems are becoming the trend of the technology development in the future, particularly portable electronic devices which are popular among public demands. In order to provide a wider range of user experiences, the smart electronic devices equipped with one, two, three or more imaging lens assemblies gradually become mainstream products in the market, while the image quality requirements of the imaging lens assemblies are getting stricter and stricter.

In order to enhance the image quality of an imaging lens assembly, the process of manufacturing the imaging lens assembly usually includes a lens calibration step. In a conventional calibration technique, a channel is disposed on an object-end surface of a barrel for calibrating and aligning a lens element closest to the object side merely, but the calibration jig shall be redesigned and remade based on a different imaging lens assembly. In another conventional calibration technique, a lens element other than a lens element closest to the object side can be calibrated. However, the optimization of the image resolutions could not be achieved by the adjustment and the calibration, and the lens alignment is only implemented by pushing the lens element. Accordingly, the conventional calibration techniques for the imaging lens assemblies still fail to satisfy the fast and accurate calibration requirements.

SUMMARY

According to one aspect of the present disclosure, an imaging lens assembly has an optical axis and includes a plastic barrel, a lens set and a retaining element. The plastic barrel includes a first channel and a second channel, wherein the first channel is extended along a direction surrounding the optical axis, the second channel is an opening on the plastic barrel, and the first channel and the second channel are separated from each other along a direction parallel to the optical axis. The lens set is disposed in the plastic barrel and includes at least one adjustable lens element, wherein an outer diameter surface of the adjustable lens element includes a plurality of axial rotation structures, each of the axial rotation structures is in a protruding strip shape, and at least one of the axial rotation structures is disposed correspondingly to the second channel of the plastic barrel and exposed. The retaining element is disposed in the plastic barrel and includes an anti-releasing structure, which is disposed correspondingly to the first channel of the plastic barrel to avoid the lens set being released from the plastic barrel.

According to another aspect of the present disclosure, a camera module includes the imaging lens assembly according to the foregoing aspect.

According to another aspect of the present disclosure, an electronic device includes the camera module according to the foregoing aspect and an image sensor. The image sensor is disposed on an image surface of the camera module.

According to another aspect of the present disclosure, an imaging lens assembly has an optical axis and includes a plastic barrel, a lens set and a retaining element. The plastic barrel includes a first channel and a second channel, wherein the second channel is an opening on the plastic barrel and extended along a direction surrounding the optical axis. The lens set is disposed in the plastic barrel and includes at least one adjustable lens element, wherein an outer diameter surface of the adjustable lens element includes a plurality of axial rotation structures, each of the axial rotation structures is in a protruding strip shape and extended along a direction parallel to the optical axis, and at least one of the axial rotation structures is disposed correspondingly to the second channel of the plastic barrel and exposed. The retaining element is disposed in the plastic barrel and includes an anti-releasing structure, which is disposed correspondingly to the first channel of the plastic barrel to avoid the lens set being released from the plastic barrel. When a length of each of the axial rotation structures is d, and a width of the second channel is w2, the following condition is satisfied: $d > w2$.

According to another aspect of the present disclosure, a camera module includes the imaging lens assembly according to the foregoing aspect.

According to another aspect of the present disclosure, an electronic device includes the camera module according to the foregoing aspect and an image sensor. The image sensor is disposed on an image surface of the camera module.

According to another aspect of the present disclosure, an external adjusting jig is for manufacturing an imaging lens assembly, wherein the imaging lens assembly has an optical axis and includes a plastic barrel, a lens set and a retaining element, the plastic barrel includes a second channel, the second channel is an opening on the plastic barrel and extended along a direction surrounding the optical axis, the lens set is disposed in the plastic barrel and includes at least one adjustable lens element, an outer diameter surface of the adjustable lens element includes a plurality of axial rotation structures, one of the axial rotation structures is disposed correspondingly to the second channel of the plastic barrel and exposed, and the retaining element is for avoiding the lens set being released from the plastic barrel. The external adjusting jig includes a contact surface, wherein when the imaging lens assembly is being manufactured, the contact surface directly contacts the one of the axial rotation structures via the second channel to rotate the adjustable lens element around the optical axis.

BRIEF DESCRIPTION OF THE DRAWINGS

The present disclosure can be more fully understood by reading the following detailed description of the embodiment, with reference made to the accompanying drawings as follows:

FIG. 1A is a three-dimensional view of an imaging lens assembly according to the 1st embodiment of the present disclosure.

FIG. 1F is a schematic view of an image captured by the imaging lens assembly before calibrating the adjustable lens element according to the 1st embodiment.

FIG. 1G is a schematic view of another image captured by the imaging lens assembly before calibrating the adjustable lens element according to the 1st embodiment.

FIG. 1H is a schematic view of further another image captured by the imaging lens assembly before calibrating the adjustable lens element according to the 1st embodiment.

FIG. 1I is a schematic view of an image captured by the imaging lens assembly after calibrating the adjustable lens element according to the 1st embodiment.

FIG. 1J is a schematic view of another image captured by the imaging lens assembly after calibrating the adjustable lens element according to the 1st embodiment.

FIG. 1K is a schematic view of further another image captured by the imaging lens assembly after calibrating the adjustable lens element according to the 1st embodiment.

FIG. 2D is a schematic view of the adjustable lens element according to FIG. 2B.

FIG. 2E is a schematic view of the retaining element according to FIG. 2B.

FIG. 3D is a schematic view of parameters of the imaging lens assembly according to FIG. 3B.

FIG. 4A is a schematic view of an external adjusting jig according to the 4th embodiment of the present disclosure and an imaging lens assembly.

DETAILED DESCRIPTION

1st Embodiment

Figure 1B:
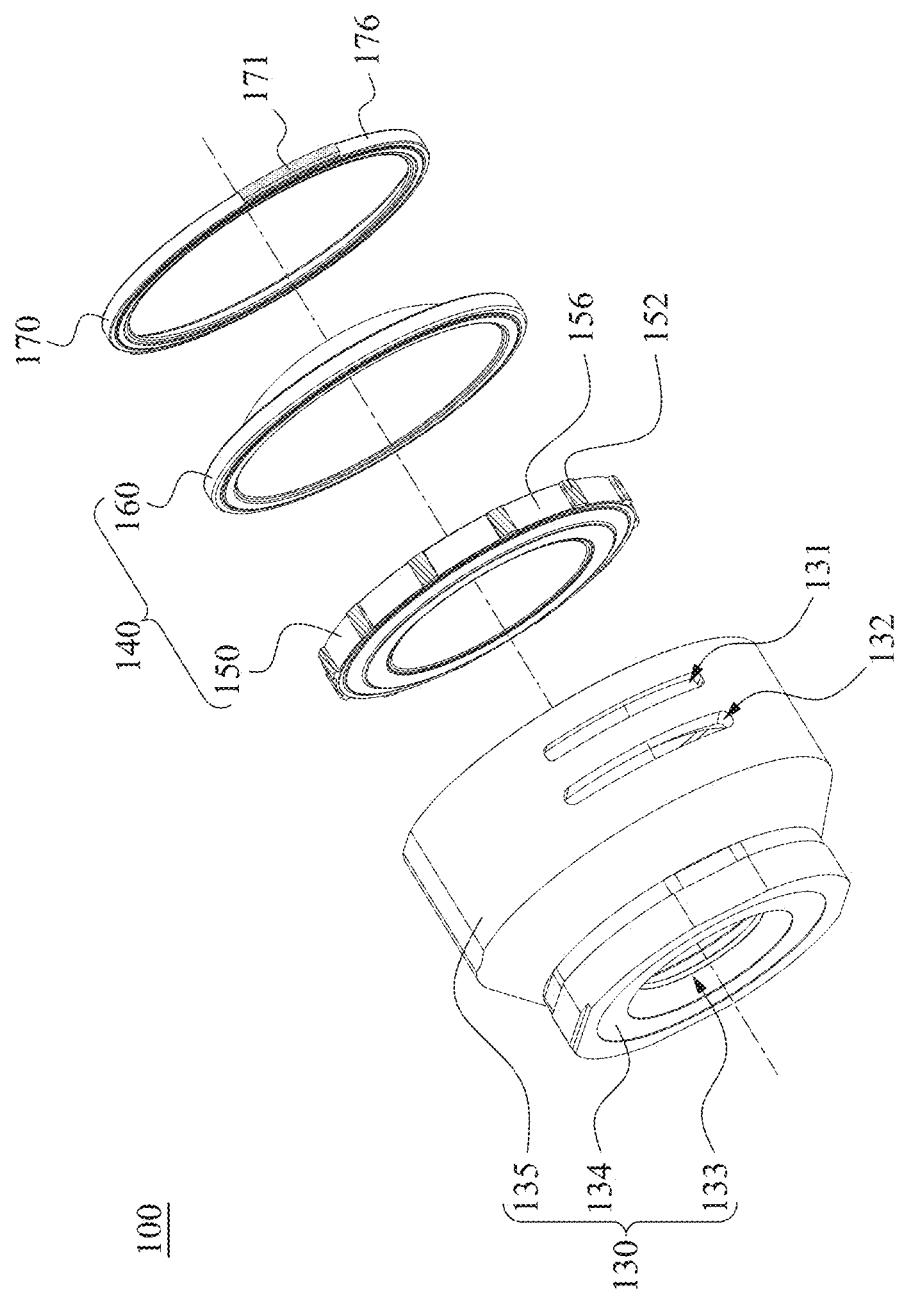
FIG. 1B is an exploded view of the imaging lens assembly according to the 1st embodiment.
Figure 1C:
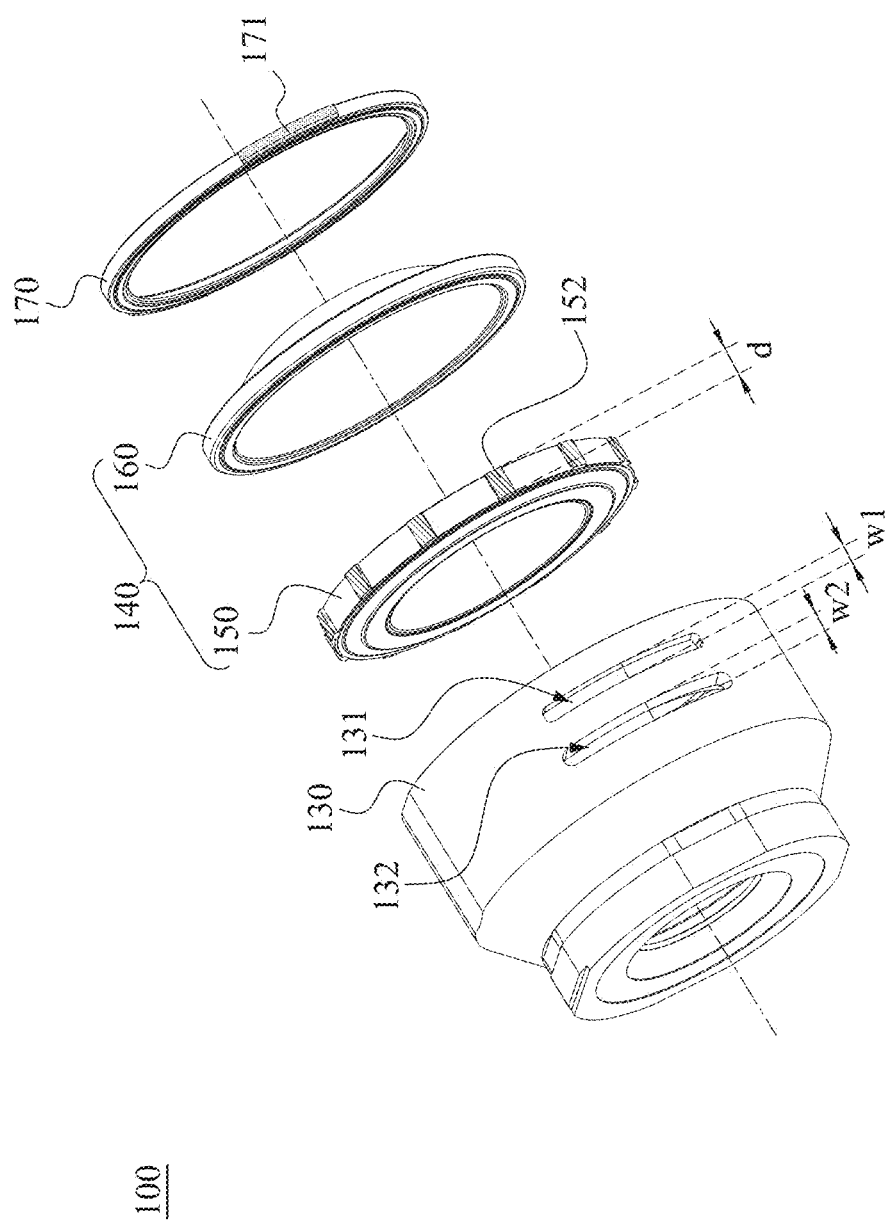
FIG. 1C is a schematic view of parameters of the imaging lens assembly according to the 1st embodiment.

FIG. 1A is a three-dimensional view of an imaging lens assembly 100 according to the 1st embodiment of the present disclosure, FIG. 1B is an exploded view of the imaging lens assembly 100 according to the 1st embodiment, and FIG. 1C is a schematic view of parameters of the imaging lens assembly 100 according to the 1st embodiment. In FIG. 1A to FIG. 1C, the imaging lens assembly 100 has an optical axis (its reference numeral is omitted) and includes a plastic barrel 130, a lens set 140 and a retaining element 170, wherein the optical axis of the imaging lens assembly 100 is also an optical axis of the lens set 140.

The plastic barrel 130 includes a first channel 131 and a second channel 132. The second channel 132 is an opening on the plastic barrel 130.

Figure 1E:
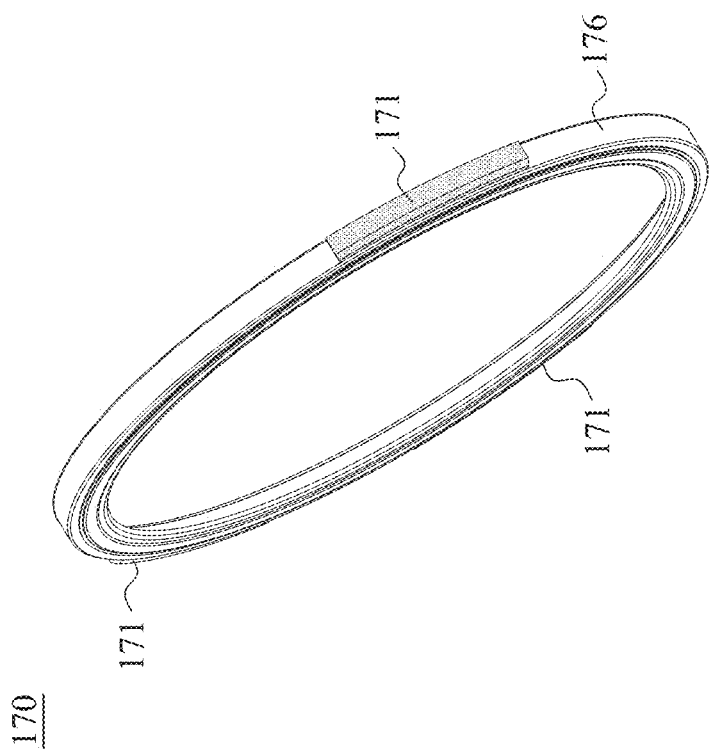
FIG. 1E is a schematic view of the retaining element according to FIG. 1B.
Figure 1D:
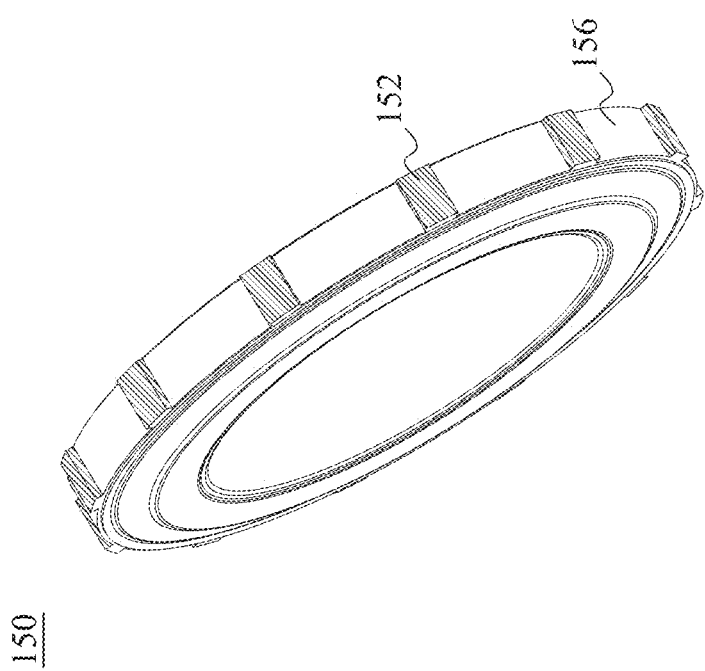
FIG. 1D is a schematic view of the adjustable lens element according to FIG. 1B.

FIG. 1D is a schematic view of an adjustable lens element 150 according to FIG. 1B. In FIG. 1A to FIG. 1D, the lens set 140 is disposed in the plastic barrel 130 and includes at least one adjustable lens element 150, wherein an outer diameter surface 156 of the adjustable lens element 150 includes a plurality of axial rotation structures 152, each of the axial rotation structures 152 is in a protruding strip shape, and at least one of the axial rotation structures 152 is disposed correspondingly to the second channel 132 of the plastic barrel 130 and exposed (or uncovered). Specifically, the at least one of the axial rotation structures 152 is exposed via the second channel 132 in the opening type, and the at least one of the axial rotation structures 152 neither contacts the plastic barrel 130 nor enters into the second channel 132. In the 1st embodiment, a number of the second channel 132 may be at least one.

In the 1st embodiment, a number of the axial rotation structures 152 is twelve, wherein the axial rotation structures 152 have the same or similar shapes and dimensions, and the axial rotation structures 152 are arranged with the same spacing on the outer diameter surface 156 of the adjustable lens element 150 along a direction surrounding the optical axis. The adjustable lens element 150 assembled in the plastic barrel 130 is able to be rotated around the optical axis relative to the plastic barrel 130 and then positioned at a rotational position. For the rotational position, three of the axial rotation structures 152 are disposed correspondingly to the second channel 132 of the plastic barrel 130 and exposed, shown in FIG. 1A, wherein one of the three of the axial rotation structures 152 is completely exposed, and the other two of the three of the axial rotation structures 152 is partially exposed. In addition, the adjustable lens element 150 is able to be rotated around the optical axis relative to the plastic barrel 130 and then positioned at another rotational position. For the another rotational position, two of the axial rotation structures 152 are disposed correspondingly to the second channel 132 of the plastic barrel 130 and exposed (not shown in drawings).

FIG. 1E is a schematic view of the retaining element 170 according to FIG. 1B. In FIG. 1A to FIG. 10 and FIG. 1E, the retaining element 170 is disposed in the plastic barrel 130 and on an image side of the lens set 140. The retaining element 170 includes an anti-releasing structure 171, wherein the anti-releasing structure 171 is disposed correspondingly to the first channel 131 of the plastic barrel 130 to avoid the lens set 140 being released from the plastic barrel 130.

Specifically, a lens gap between the adjustable lens element 150 and its adjacent lens element (e.g. a lens element 160) of the lens set 140 could be flexibly maintained by the retaining element 170, so that the adjustable lens element 150 assembled in the plastic barrel 130 is able to be rotated around the optical axis relative to the plastic barrel 130. Furthermore, surfaces facing each other of the adjustable lens element 150 and the adjacent lens element are smooth, so that the adjacent lens element would not be led to be rotated around the optical axis by the adjustable lens element 150 being rotated when the adjacent lens element contacts the adjustable lens element 150, as well as elements other than the adjustable lens element 150 of the imaging lens assembly 100 are also not led to be rotated around the optical axis by the adjustable lens element 150. The anti-releasing structure 171 has a protrusion shape, wherein the anti-releasing structure 171 contacts and is engaged with the first channel 131 of the plastic barrel 130 to avoid the lens set 140 being released from the plastic barrel 130.

In the 1st embodiment, a number of the anti-releasing structure 171 is three. One of the three anti-releasing structures 171 is disposed correspondingly to one first channel 131, shown in FIG. 1A. The other two of the three anti-releasing structures 171 may be disposed correspondingly to another two first channels 131 respectively, or disposed correspondingly to only another one first channel 131 together, and thereby a number of the first channel 131 may be two or three.

In FIG. 1B, a total number of lens elements of the lens set 140 is at least two. Specifically, the total number of the lens elements of the lens set 140 is six (the other four of the lens elements are omitted in the drawings), and the other detailed descriptions are omitted herein. One of the at least two lens elements is the adjustable lens element 150, and the other one of the at least two lens elements is the lens element 160, which is not an adjustable lens element. The adjustable lens element 150 and the lens element 160 are arranged in order from an object side to the image side of the lens set 140. In other embodiments according to the present disclosure (not shown in drawings), a lens set may further include other kinds of optical elements, such as a spacer and a light blocking sheet, which can be disposed between two adjacent lens elements. One, two, or at least three of lens elements of the lens set may be adjustable lens elements, which are not limited to be disposed close to an object side or an image side, and a retaining element is disposed on the image side of the lens set.

In FIG. 1A to FIG. 10, the first channels 131 may be extended along the direction surrounding the optical axis. That is, a length along the direction surrounding the optical axis of each of the first channels 131 may be greater than a length along a direction parallel to the optical axis of each of the first channels 131. In other embodiments according to the present disclosure (not shown in drawings), an anti-releasing structure is disposed correspondingly to a first channel of a plastic barrel, and the first channel may not be extended along a direction surrounding an optical axis. That is, a length along the direction surrounding the optical axis of the first channel may be equal to or smaller than a length along a direction parallel to the optical axis of the first channel.

The second channel 132 and one of the first channels 131 may be separated from each other along the direction parallel to the optical axis. In the 1st embodiment, the first channels 131 are disposed correspondingly to the anti-releasing structures 171 of the retaining element 170, and the second channel 132 is disposed correspondingly to at least two of the axial rotation structures 152 of the adjustable lens element 150. The retaining element 170 is disposed on the image side of the adjustable lens element 150, and thereby the first channels 131 are closer to the image side than the second channel 132 to the image side. The one of the first channel 131 is disposed on a corresponding position closer to the image side in respect with the second channel 132, and it is that the one of the first channels 131 and the second channel 132 are separated from each other along the direction parallel to the optical axis. In other embodiments according to the present disclosure (not shown in drawings), a first channel may not be disposed on a corresponding position closer to an image side in respect with a second channel, and it is that the first channel and the second channel may not be separated from each other along a direction parallel to an optical axis.

According to the mechanical configuration of the imaging lens assembly 100, it is favorable for performing a step of calibrating the adjustable lens element 150 by an external adjusting jig in a process of manufacturing the imaging lens assembly 100, wherein the external adjusting jig may be an external adjusting jig 380 described in the third embodiment, an external adjusting jig 480 described in the fourth embodiment, an external adjusting jig 580 described in the fifth embodiment, or an external adjusting jig 680 described in the sixth embodiment in accordance with the present disclosure, but not limited thereto. In the step of calibrating the adjustable lens element 150 by the external adjusting jig, the one of the axial rotation structures 152 is disposed correspondingly to the second channel 132 of the plastic barrel 130 and exposed. The external adjusting jig includes a contact surface. The contact surface directly contacts one surface the one of the axial rotation structures 152 via the second channel 132 to rotate the adjustable lens element 150 around the optical axis, and the optical data, e.g. images from the contrast examinations, of every of the plurality of rotational positions of the adjustable lens element 150 are measured and recorded. Next, one of the rotational positions corresponding to the best one among the optical data is determined as a fixed position of the adjustable lens element 150, and the adjustable lens element 150 is rotated and positioned to the fixed position so as to accurately correct the assembling defects and the lens tilt.

Furthermore, the imaging lens assembly 100 is advantageous in designing the external adjusting jig so as to fast and accurately calibrate the adjustable lens element 150. In the step of calibrating the adjustable lens element 150, the anti-releasing structures 171 designed in the retaining element 170 are favorable for avoiding affecting the original spaces between the adjacent lens elements of the lens set 140 and unnecessarily and extra enlarging the tolerances. The first channels 131 and the second channel 132 separated from each other prevent the imaging lens assembly 100 from glue overflow in a possible glue dispensing step afterward.

FIG. 1F to FIG. 1H are three schematic views of images captured by the imaging lens assembly 100 before the step of calibrating the adjustable lens element 150, and FIG. 1I to FIG. 1K are three schematic views of images captured by the imaging lens assembly 100 after the step of calibrating the adjustable lens element 150 correspondingly to FIG. 1F to FIG. 1H, respectively. FIG. 1F to FIG. 1K may be images from the contrast examinations for the imaging lens assembly 100, wherein FIG. 1F, FIG. 1H, FIG. 1I and FIG. 1K are image sections of an object, which is a target pattern of white areas (stripes) and black areas (stripes) alternately arranged and having an angle of 7 degrees with the horizontal direction, and FIG. 1G and FIG. 1J are image sections of another object, which is a target pattern of white areas and black areas alternately arranged and having an angle of 7 degrees with the vertical direction.

In a comparison between FIG. 1F and FIG. 1I, FIG. 1F and FIG. 1I are images captured by the imaging lens assembly 100 respectively before and after the step of calibrating the adjustable lens element 150, and a border between a white area 121 and a black area 122 in FIG. 1I is clearer than a border between a white area 101 and a black area 102 in FIG. 1F. In a comparison between FIG. 1G and FIG. 1J, FIG. 1G and FIG. 1J are images captured by the imaging lens assembly 100 respectively before and after the step of calibrating the adjustable lens element 150, and a border between a white area 123 and a black area 124 in FIG. 1J is clearer than a border between a white area 103 and a black area 104 in FIG. 1G. In a comparison between FIG. 1H and FIG. 1K, FIG. 1H and FIG. 1K are images captured by the imaging lens assembly 100 respectively before and after the step of calibrating the adjustable lens element 150, and a border between a white area 125 and a black area 126 in FIG. 1K is clearer than a border between a white area 105 and a black area 106 in FIG. 1H. Therefore, the mechanical configuration of the imaging lens assembly 100 is favorable for performing the step of calibrating the adjustable lens element 150 by the external adjusting jig in the process of manufacturing the imaging lens assembly 100 so as to effectively reduce the assembling process defects, such as the lens tilt, the eccentricity and so on, and provide images featured with better contrast properties and resolutions captured by the imaging lens assembly 100.

In FIG. 1A to FIG. 1O, the second channel 132 may be extended along the direction surrounding the optical axis. That is, a length along the direction surrounding the optical axis of the second channel 132 may be greater than a length along the direction parallel to the optical axis of the second channel 132. Therefore, it is favorable for enlarging the rotation range of the adjustable lens element 150 so as to obtain an optimized image with a better image quality. In other embodiments according to the present disclosure (not shown in drawings), at least one of the axial rotation structures is disposed correspondingly to the second channel of the plastic barrel and exposed, and the second channel may not be extended along a direction surrounding an optical axis. That is, a length along the direction surrounding the optical axis of the second channel may be equal to or smaller than a length along a direction parallel to the optical axis of the second channel.

In FIG. 1A to FIG. 1D, each of the axial rotation structures 152 may be extended along the direction parallel to the optical axis. That is, a length along the direction parallel to the optical axis of each of the axial rotation structures 152 may be greater than a length along the direction surrounding the optical axis of each of the axial rotation structures 152. Therefore, it is favorable for the injection molding manufacturing method of the adjustable lens element 150. In other embodiments according to the present disclosure (not shown in drawings), each of a plurality of axial rotation structures is in a protruding strip shape, and each of the axial rotation structures may be extended along a direction inclined with an optical axis.

In FIG. 1O, when a length of each of the axial rotation structures 152 is d, and a width of the second channel 132 is w2, the following condition may be satisfied: $d>w2$. Therefore, it is favorable for improving the efficiency of rotating the adjustable lens element 150 by the external adjusting jig, and preventing the adjustable lens element 150 from being a tilt during rotating the adjustable lens element 150. Furthermore, it is favorable for obtaining an optimized image with a better image quality. The second channel 132 being wider allows the external adjusting jig with a more volume to contact the one of the axial rotation structures 152 so as to increase the calibration accuracy. In the 1st embodiment, the parameter d is the length along the direction parallel to the optical axis of each of the axial rotation structures 152, and the parameter w2 is the length along the direction parallel to the optical axis of the second channel 132.

In FIG. 1A to FIG. 1O and FIG. 1E, one of the first channels 131 may be another opening on the plastic barrel 130, and one of the anti-releasing structures 171 of the retaining element 170 is disposed correspondingly to the one of the first channel 131 of the plastic barrel 130 and exposed. Therefore, it is favorable for inspecting if the lens set 140 has been indeed fixed by the anti-releasing structures 171 so as to effectively manage and control the quality of the imaging lens assembly 100 during mass production. In the 1st embodiment, the number of the anti-releasing structures 171 is three. One of the three anti-releasing structures 171 is disposed correspondingly to one of the first channels 131 in the opening type, wherein the one of the three anti-releasing structures 171 contacts and is engaged with the plastic barrel 130 via the one of the first channels 131 as shown in the FIG. 1A. The other two of the three anti-releasing structures 171 may be disposed correspondingly to at least another one of the first channels 131 in an opening type, or correspondingly to at least another one of the first channels 131 in a groove type (not shown in drawings), which is a groove on an inner diameter surface of the plastic barrel 130. The other two of the three anti-releasing structures 171 contact and are engaged with the plastic barrel 130 via the at least another one of the first channels 131.

Each of the anti-releasing structures 171 may be disposed on an outer diameter surface 176 of the retaining element 170 and extended along the direction surrounding the optical axis. That is, each of the anti-releasing structures 171 is in a protruding strip shape, and a length along the direction surrounding the optical axis of each of the anti-releasing structures 171 may be greater than a length along the direction parallel to the optical axis of each of the anti-releasing structures 171. Therefore, it is favorable for enhancing the fixing stability of the lens set 140. In other embodiments according to the present disclosure (not shown in drawings), a length along a direction surrounding an optical axis of an anti-releasing structure may be equal to or smaller than a length along the direction parallel to the optical axis of an anti-releasing structure.

In FIG. 1D, when a number of the axial rotation structures 152 of the adjustable lens element 150 is N, the following condition may be satisfied: 7<N<20. The axial rotation structures arranged too densely (the number N being overly large) or too sparsely (the number N being overly small) would affect the calibration efficiency by an external adjusting jig. In case the axial rotation structures are arranged too densely, the external adjusting jig having fine structures would be damaged more often. In case the axial rotation structures are arranged too sparsely, the calibration range would be limited or divided into separated sections, so that the external adjusting jig would be limited to find the axial rotation structures in protruding strip shapes in small calibration ranges or under skipping a certain range. The adjustable lens element 150 satisfying the range of the number N is advantageous in effectively solving the problems mentioned in this paragraph.

In FIG. 1A to FIG. 10, the plastic barrel 130 further includes an object-side surface 134, an object-side opening 133 and a tube portion 135, wherein the object-side surface 134 surrounds the object-side opening 133, the tube portion 135 is connected to the object-side surface 134 and disposed correspondingly to the object-side opening 133, and one of the first channels 131 and the second channel 132 may be both disposed on the tube portion 135 and separated from each other along the direction parallel to the optical axis. Therefore, the second channel 132 disposed on the tube portion 135 is advantageous in designing only one external adjusting jig (avoiding designing another external adjusting jig) to be applicable to at least two adjustable lens elements in the plastic barrel 130. Furthermore, the second channel 132 is implemented for calibrating the adjustable lens element 150 by the external adjusting jig to obtain an alignment with the optical axis and an image with optimized resolutions, so that it overcomes the problems in the conventional calibration technique, such as a need of designing another external adjusting jig, a limited choice of adjustable lens elements, a limited calibration range and so on.

Figure 10:
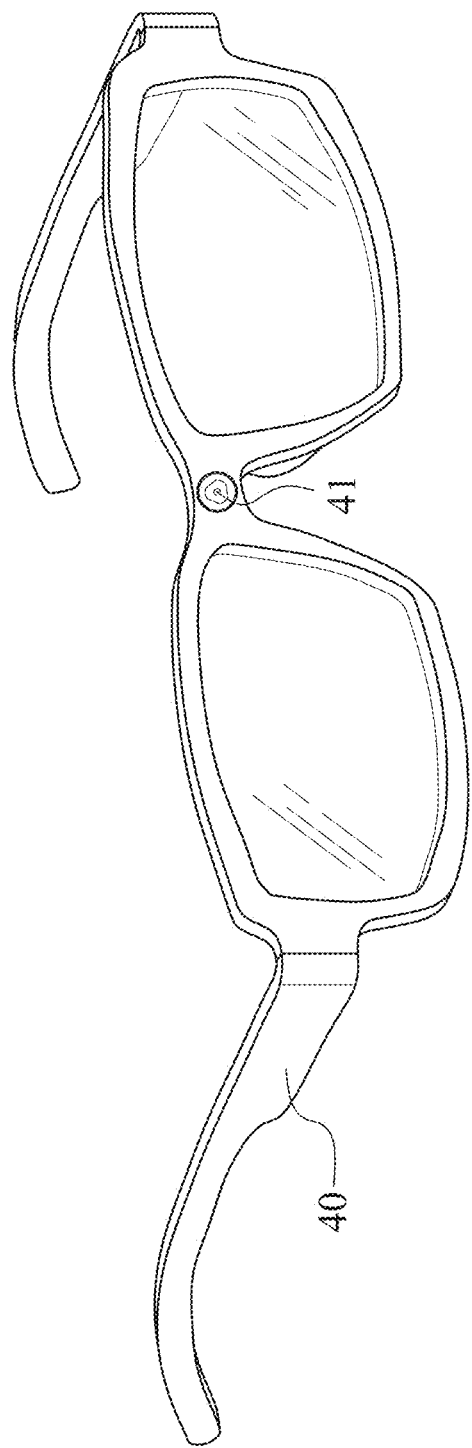
FIG. 10 shows an electronic device according to the 10th embodiment of the present disclosure.

In FIG. 10, the first channel 131 may be extended along the direction surrounding the optical axis. When a width of the first channel 131 is w1, and the width of the second channel 132 is w2, the following condition may be satisfied: 0.6<w1/w2<1.6. Therefore, the parameters w1 and w2 being similar are advantageous to the external adjusting jig to be used for assembling the retaining element 170 so as to avoid designing an additional assembling jig and reducing the cost. In the 1st embodiment, the parameter w1 is the length along the direction parallel to the optical axis of each of the first channels 131, and the parameter w2 is the length along the direction parallel to the optical axis of the second channel 132.

The data of the aforementioned parameters of the imaging lens assembly 100 according to the 1st embodiment of the present disclosure are listed in the following Table 1, wherein the parameters are also shown as FIG. 10.

TABLE 1

| 1st Embodiment | | | |
| --- | --- | --- | --- |
| d (mm) | 2.41 | w1/w2 | 0.84 |
| w1 (mm) | 1.45 | N | 12 |
| w2 (mm) | 1.72 | | |

2nd Embodiment

Figure 2A:
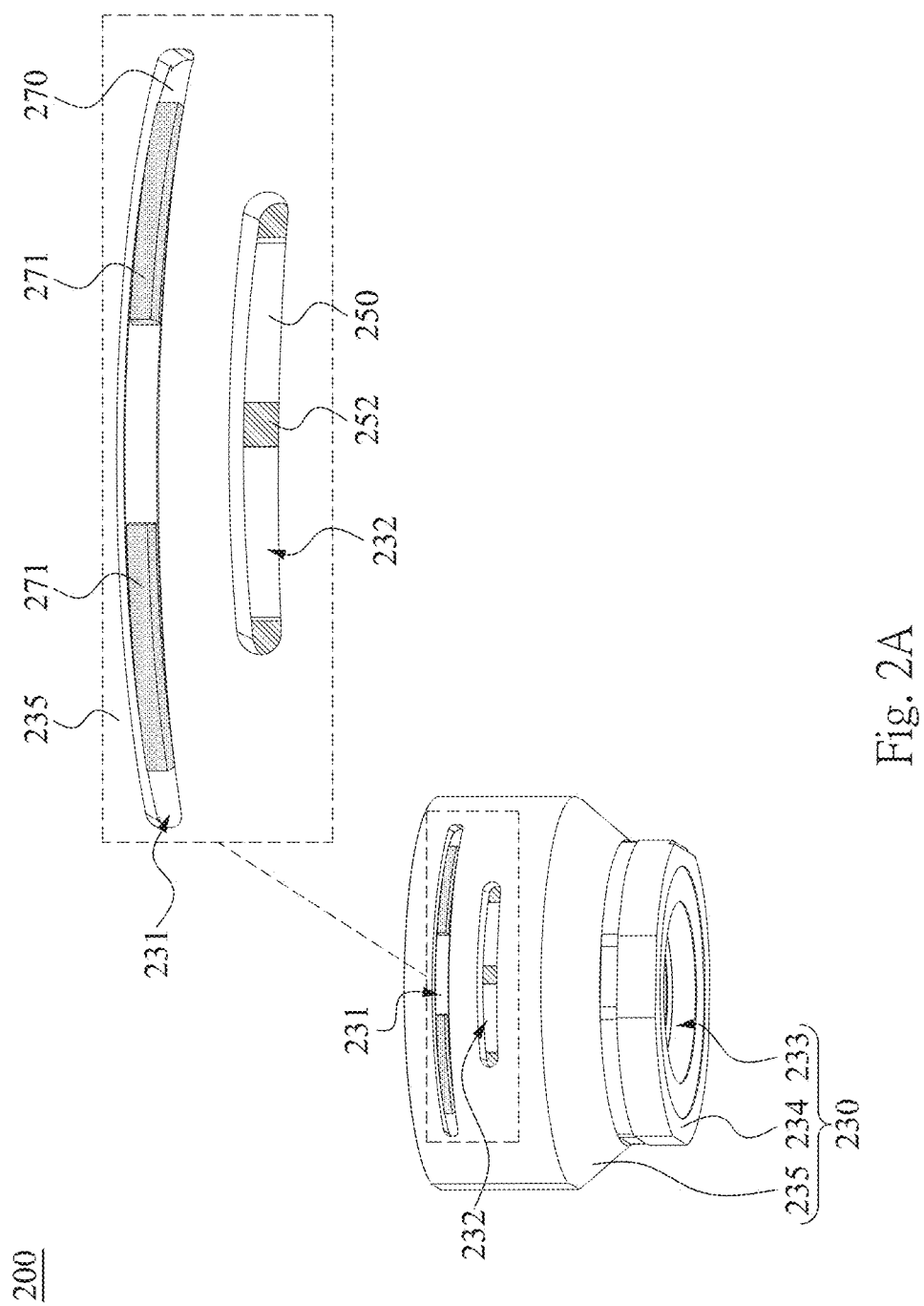
FIG. 2A is a three-dimensional view of an imaging lens assembly according to the 2nd embodiment of the present disclosure.
Figure 2B:
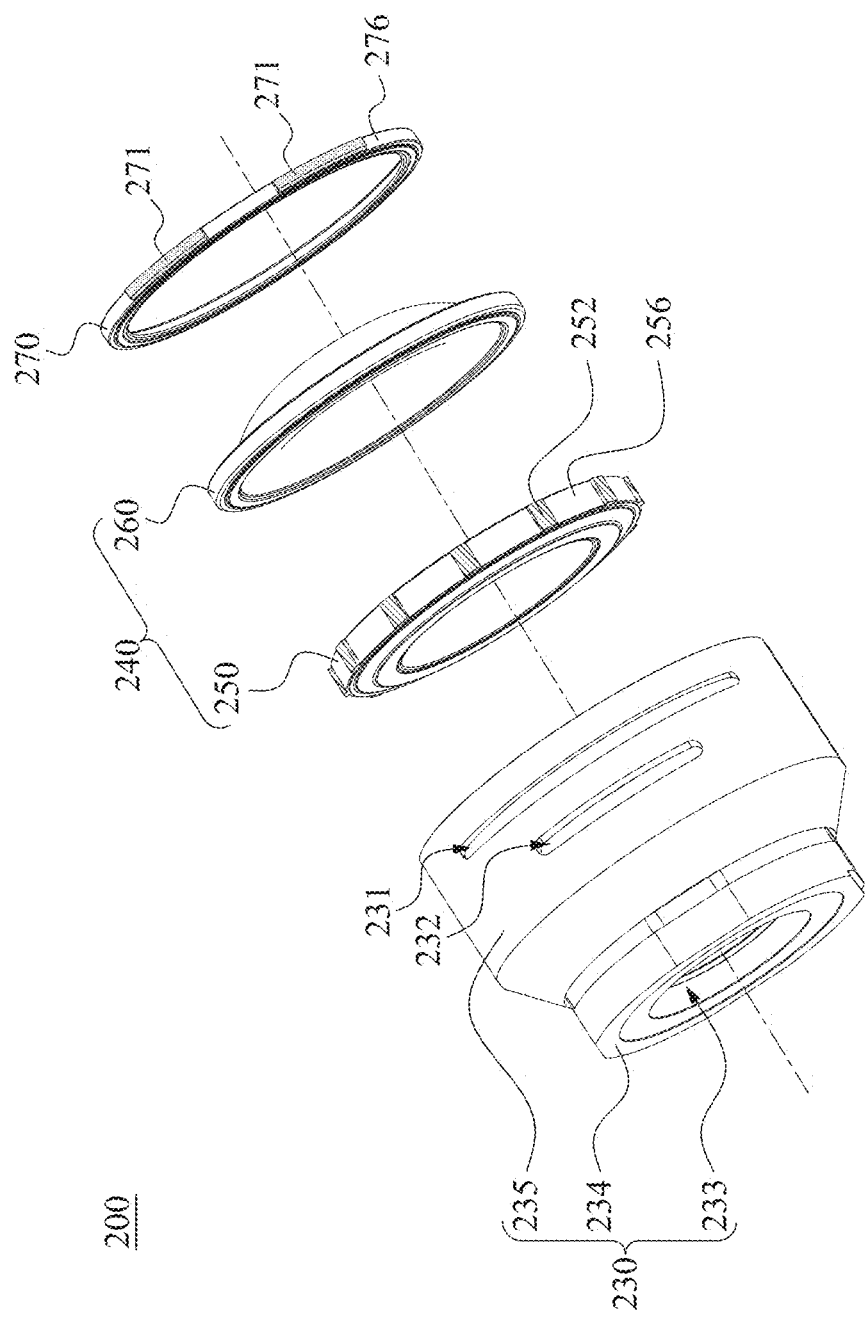
FIG. 2B is an exploded view of the imaging lens assembly according to the 2nd embodiment.
Figure 2C:
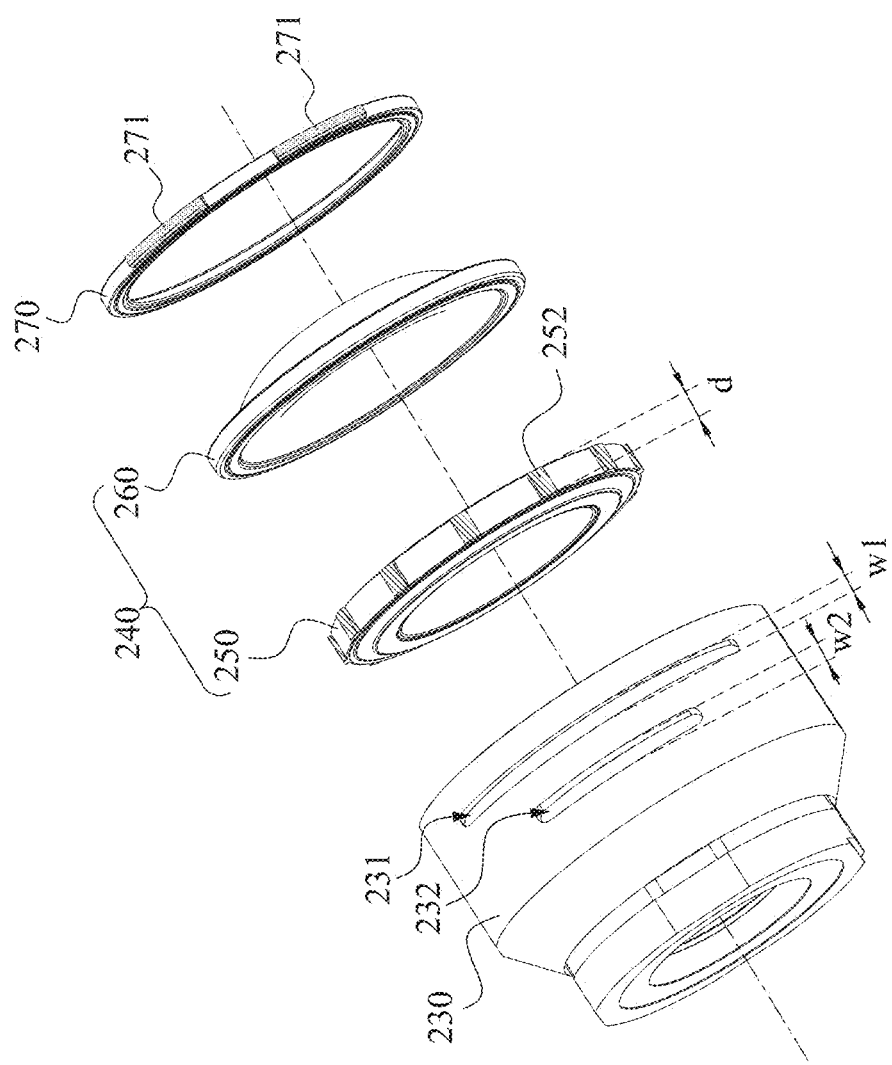
FIG. 2C is a schematic view of parameters of the imaging lens assembly according to the 2nd embodiment.

FIG. 2A is a three-dimensional view of an imaging lens assembly 200 according to the 2nd embodiment of the present disclosure, FIG. 2B is an exploded view of the imaging lens assembly 200 according to the 2nd embodiment, and FIG. 2C is a schematic view of parameters of the imaging lens assembly 200 according to the 2nd embodiment. In FIG. 2A to FIG. 2C, the imaging lens assembly 200 has an optical axis (its reference numeral is omitted) and includes a plastic barrel 230, a lens set 240 and a retaining element 270, wherein the optical axis of the imaging lens assembly 200 is also an optical axis of the lens set 240.

The plastic barrel 230 includes a first channel 231 and a second channel 232. The second channel 232 is an opening on the plastic barrel 230.

FIG. 2D is a schematic view of an adjustable lens element 250 according to FIG. 2B. In FIG. 2A to FIG. 2D, the lens set 240 is disposed in the plastic barrel 230 and includes at least one adjustable lens element 250, wherein an outer diameter surface 256 of the adjustable lens element 250 includes a plurality of axial rotation structures 252, each of the axial rotation structures 252 is in a protruding strip shape, and at least one of the axial rotation structures 252 is disposed correspondingly to the second channel 232 of the plastic barrel 230 and exposed. Specifically, the at least one of the axial rotation structures 252 is exposed via the second channel 232 in the opening type, and the at least one of the axial rotation structures 252 neither contacts the plastic barrel 230 nor enters into the second channel 232. In the 2nd embodiment, a number of the second channel 232 is one.

In the 2nd embodiment, a number of the axial rotation structures 252 is twelve, wherein the axial rotation structures 252 have the same or similar shapes and dimensions, and the axial rotation structures 252 are arranged with the same spacing on the outer diameter surface 256 of the adjustable lens element 250 along a direction surrounding the optical axis. The adjustable lens element 250 assembled in the plastic barrel 230 is able to be rotated around the optical axis relative to the plastic barrel 230 and then positioned at a rotational position. For the rotational position, three of the axial rotation structures 252 are disposed correspondingly to the second channel 232 of the plastic barrel 230 and exposed, shown in FIG. 2A, wherein one of the three of the axial rotation structures 252 is completely exposed, and the other two of the three of the axial rotation structures 252 is partially exposed. In addition, the adjustable lens element 250 is able to be rotated around the optical axis relative to the plastic barrel 230 and then positioned at another rotational position. For the another rotational position, two of the axial rotation structures 252 are disposed correspondingly to the second channel 232 of the plastic barrel 230 and exposed (not shown in drawings).

FIG. 2E is a schematic view of the retaining element 270 according to FIG. 2B. In FIG. 2A to FIG. 2C and FIG. 2E, the retaining element 270 is disposed in the plastic barrel 230 and on an image side of the lens set 240. The retaining element 270 includes an anti-releasing structure 271, wherein the anti-releasing structure 271 is disposed correspondingly to the first channel 231 of the plastic barrel 230 to avoid the lens set 240 being released from the plastic barrel 230. Specifically, the anti-releasing structure 271 has a protrusion shape, wherein the anti-releasing structure 271 contacts and is engaged with the first channel 231 of the plastic barrel 230 to avoid the lens set 240 being released from the plastic barrel 230. In the 2nd embodiment, a number of the anti-releasing structure 271 is two. The two anti-releasing structures 271 are disposed correspondingly to one first channel 231 together, shown in FIG. 2A, and thereby a number of the first channel 231 is one.

In FIG. 2B, a total number of lens elements of the lens set 240 is at least two. One of the at least two lens elements is the adjustable lens element 250, and the other one of the at least two lens elements is a lens element 260, which is not an adjustable lens element. The adjustable lens element 250 and the lens element 260 are arranged in order from an object side to the image side of the lens set 240.

In FIG. 2A to FIG. 2E, the first channel 231 is extended along the direction surrounding the optical axis. Each of the anti-releasing structures 271 is disposed on an outer diameter surface 276 of the retaining element 270 and extended along the direction surrounding the optical axis. The second channel 232 is extended along the direction surrounding the optical axis, and each of the axial rotation structures 252 is extended along the direction parallel to the optical axis.

In the 2nd embodiment, the first channel 231 are disposed correspondingly to the anti-releasing structures 271 of the retaining element 270, and the second channel 232 is disposed correspondingly to at least two of the axial rotation structures 252 of the adjustable lens element 250. The retaining element 270 is disposed on the image side of the adjustable lens element 250, and thereby the first channel 231 is closer to the image side than the second channel 232 to the image side. The first channel 231 is disposed on a corresponding position closer to the image side in respect with the second channel 232, and it is that the first channel 231 and the second channel 232 are separated from each other along the direction parallel to the optical axis.

According to the aforementioned mechanical configuration of the imaging lens assembly 200, it is favorable for performing a step of calibrating the adjustable lens element 250 by an external adjusting jig in a process of manufacturing the imaging lens assembly 200, wherein the external adjusting jig may be an external adjusting jig 380 described in the third embodiment, an external adjusting jig 480 described in the fourth embodiment, an external adjusting jig 580 described in the fifth embodiment, or an external adjusting jig 680 described in the sixth embodiment in accordance with the present disclosure, but not limited thereto.

In FIG. 2A to FIG. 2C, the plastic barrel 230 further includes an object-side surface 234, an object-side opening 233 and a tube portion 235, wherein the object-side surface 234 surrounds the object-side opening 233, the tube portion 235 is connected to the object-side surface 234 and disposed correspondingly to the object-side opening 233, and the first channel 231 and the second channel 232 are both disposed on the tube portion 235 and separated from each other along the direction parallel to the optical axis.

In FIG. 2A to FIG. 2C and FIG. 2E, the one first channel 231 is another opening on the plastic barrel 230, and the anti-releasing structures 271 of the retaining element 270 are disposed correspondingly to the one first channel 231 of the plastic barrel 230 and exposed. In the 2nd embodiment, the number of the anti-releasing structures 271 is two. The two anti-releasing structures 271 are disposed correspondingly to the one first channel 231 in the opening type, wherein the two anti-releasing structures 271 contact and are engaged with the plastic barrel 230 via the one first channel 231 as shown in the FIG. 2A.

In FIG. 2C, a length of each of the axial rotation structures 252 is d, wherein the parameter d is a length along the direction parallel to the optical axis of each of the axial rotation structures 252. A width of the first channel 231 is w1, wherein the parameter w1 is a length along the direction parallel to the optical axis of each of the first channel 231. A width of the second channel 232 is w2, wherein the parameter w2 is a length along the direction parallel to the optical axis of the second channel 232.

The data of the parameters of the imaging lens assembly 200 according to the 2nd embodiment of the present disclosure are listed in the following Table 2, wherein the parameters are also shown as FIG. 2C. The definitions of these parameters shown in Table 2 are the same as those stated in the 1st embodiment with corresponding values in the 2nd embodiment.

TABLE 2

| 2nd Embodiment | | | |
|---|---|---|---|
| d (mm) | 2.45 | w1/w2 | 0.85 |
| w1 (mm) | 1.48 | N | 12 |
| w2 (mm) | 1.75 | | |

3rd Embodiment

Figure 3A:
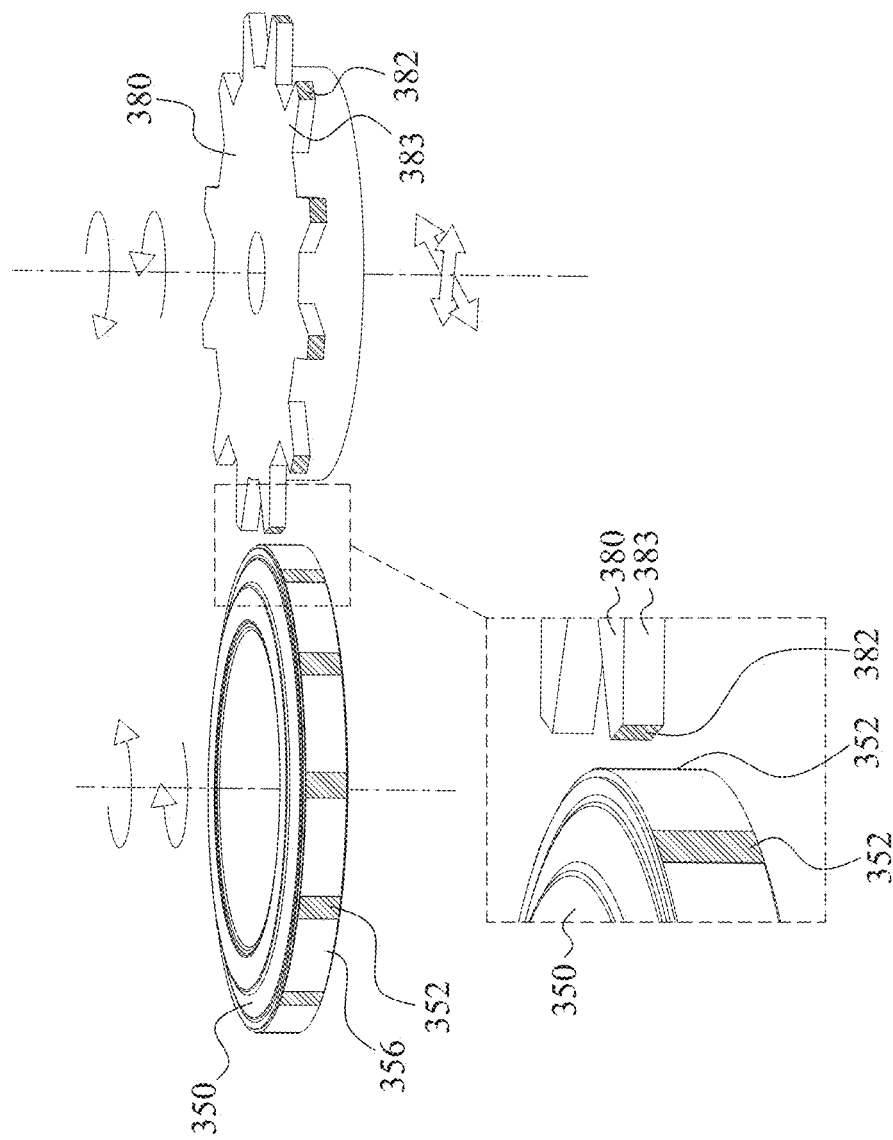
FIG. 3A is a schematic view of an external adjusting jig according to the 3rd embodiment of the present disclosure and an adjustable lens element of an imaging lens assembly.
Figure 3B:
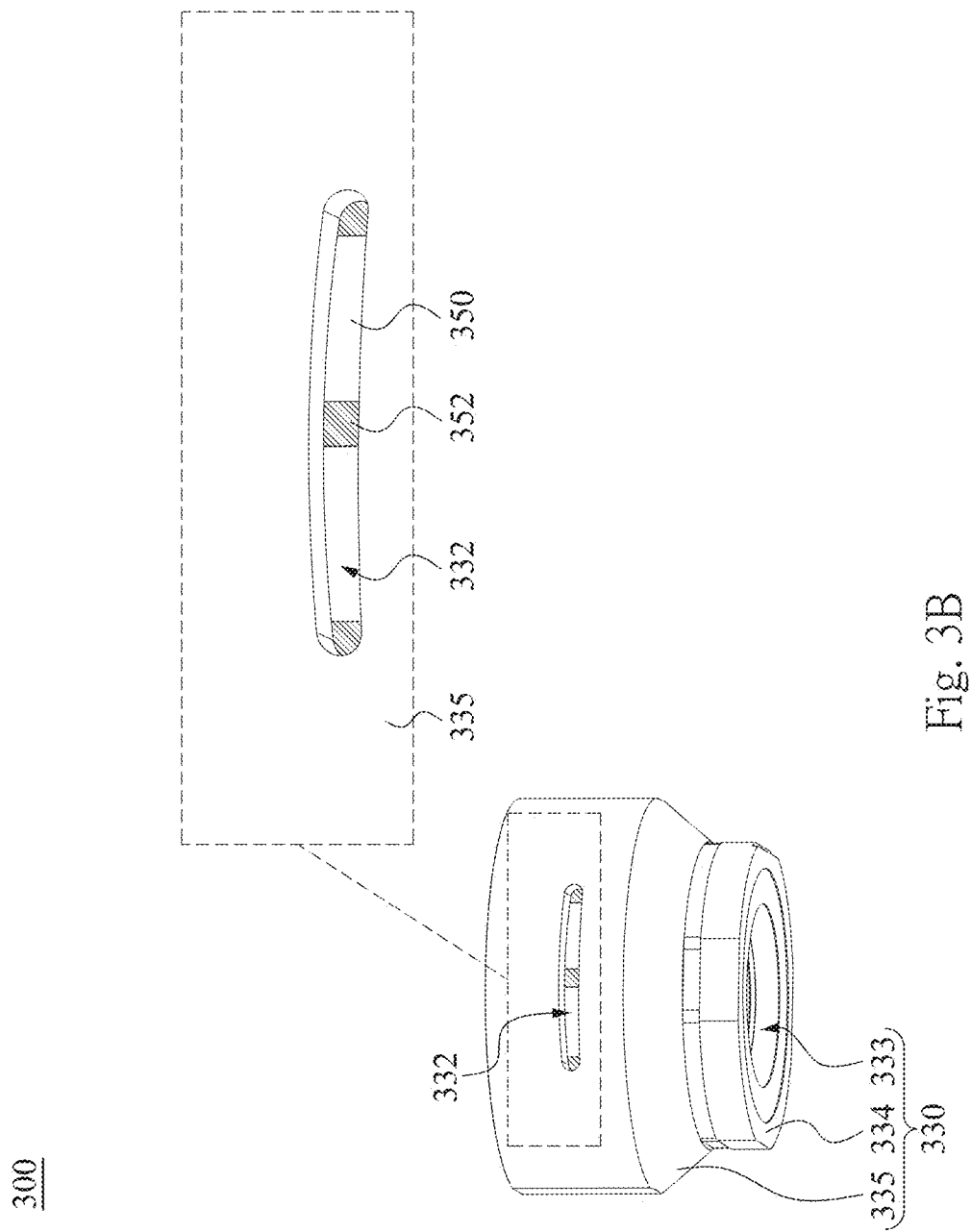
FIG. 3B is a schematic view of the imaging lens assembly manufactured by the external adjusting jig according to the 3rd embodiment.
Figure 3C:
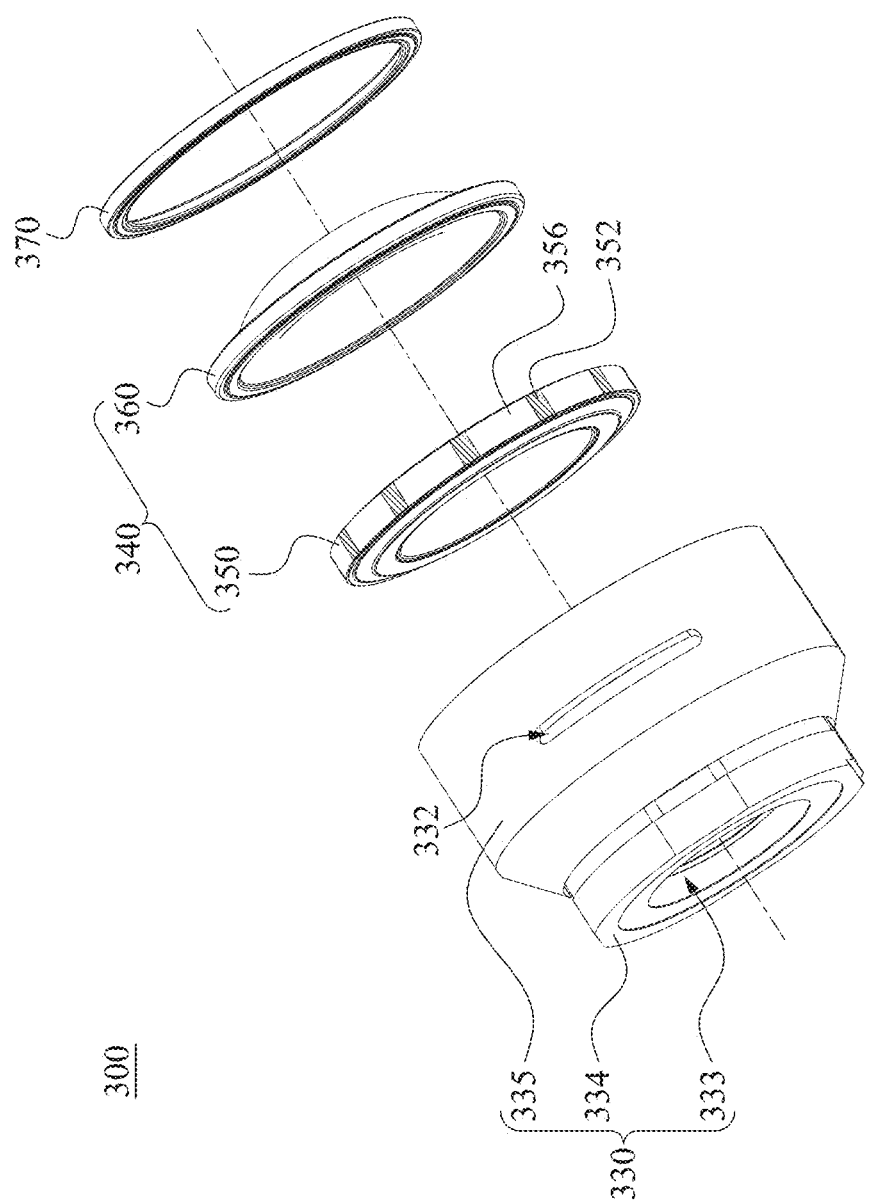
FIG. 3C is an exploded view of the imaging lens assembly according to FIG. 3B.

FIG. 3A is a schematic view of an external adjusting jig 380 according to the 3rd embodiment of the present disclosure and an adjustable lens element 350 of an imaging lens assembly 300, FIG. 3B is a schematic view of the imaging lens assembly 300 manufactured by the external adjusting jig 380 according to the 3rd embodiment, and FIG. 3C is an exploded view of the imaging lens assembly 300 according to FIG. 3B. In FIG. 3A to FIG. 3C, the external adjusting jig 380 is used in manufacturing the imaging lens assembly 300. Specifically, the imaging lens assembly 300 includes at least one adjustable lens element 350, and a process of manufacturing the imaging lens assembly 300 includes a step of calibrating the adjustable lens element 350 by the external adjusting jig 380.

In FIG. 3B and FIG. 3C, the imaging lens assembly 300 has an optical axis (its reference numeral is omitted) and includes a plastic barrel 330, a lens set 340 and a retaining element 370. The plastic barrel 330 includes a second channel 332, wherein the second channel 332 is an opening on the plastic barrel 330 and extended along a direction surrounding the optical axis. The lens set 340 is disposed in the plastic barrel 330 and includes the at least one adjustable lens element 350, wherein an outer diameter surface 356 of the adjustable lens element 350 includes a plurality of axial rotation structures 352, and one of the axial rotation structures 352 is disposed correspondingly to the second channel 332 of the plastic barrel 330 and exposed. The retaining element 370 is for avoiding the lens set 340 being released from the plastic barrel 330.

In FIG. 3A, the external adjusting jig 380 includes a contact surface 382, wherein when the imaging lens assembly 300 is manufactured, the contact surface 382 directly contacts the one of the axial rotation structures 352 via the second channel 332 to rotate the adjustable lens element 350 around the optical axis relative to the plastic barrel 330. Furthermore, elements other than the adjustable lens element 350 of the imaging lens assembly 300 are omitted in FIG. 3A, and for clearly showing the structural details and the position relationships between the contact surface 382 and the one of the axial rotation structures 352, FIG. 3A does not show the actual direct contact condition between the contact surface 382 and the one of the axial rotation structures 352. Therefore, the axial rotation structures 352 may come from part of the outer diameter surface 356 being after a surface machining process, so as to increase a static friction force between the contact surface 382 of the external adjusting jig 380 and the axial rotation structures 352, and thereby the engineering feasibility of accurately calibrating the adjustable lens element 350 is allowed. The contact surface 382 of the external adjusting jig 380 may be formed by a texturing process so as to reduce the design difficulty of the external adjusting jig 380 and the additional tolerance. The retaining element 370 may be fixedly disposed in the plastic barrel 330 by directly dispensing a glue between thereof to reduce the production cost of the retaining element 370.

In the 3rd embodiment, the axial rotation structures 352 may be twelve areas processed by the surface machining process and regularly arranged with the same spacing on the outer diameter surface 356, and the axial rotation structures 352 have the same or similar shapes and dimensions. The axial rotation structures 352 may be transferred from corresponding surfaces of an injection molding mold, which are processed by the surface machining process, e.g. texturing, sand blasting, electrical discharge machining (EDM), tool cutting, turning tool machining and so on, so as to increase a contact friction force between the contact surface 382 of the external adjusting jig 380 and the axial rotation structures 352. Furthermore, the external adjusting jig 380 has a central axis (its reference numeral is omitted) and includes twelve tooth portions 383 regularly arranged with the same spacing along a direction surrounding the central axis, and the tooth portions 383 have the same or similar shapes and dimensions. A front surface of each of the tooth portions 383 is the contact surface 382, and therefore the external adjusting jig 380 includes twelve contact surfaces 382. The contact surfaces 382 may be processed by the aforementioned surface machining process to increase the contact friction force between the contact surfaces 382 and the axial rotation structures 352. Accordingly, when the external adjusting jig 380 accurately rotates (spins) or has a revolution (e.g. around the optical axis of the imaging lens assembly 300), one of the contact surfaces 382 directly contacts one of the axial rotation structures 352 via the second channel 332 of the plastic barrel 330 to rotate the adjustable lens element 350 around the optical axis so as to accurately correct the assembling defects and the lens tilt.

In other embodiments according the present disclosure, an axial rotation structure of an adjustable lens element may be in a protruding shape, and at least one contact surface of an external adjusting jig is able to abut or clamp the axial rotation structure of the adjustable lens element. The contact surface of the external adjusting jig and the axial rotation structure of the adjustable lens element may be processed by the surface machining process mentioned in the above paragraph to increase a contact friction force between the contact surface and the axial rotation structure. Accordingly, when the external adjusting jig accurately rotates or has a revolution, the contact surface directly contacts the axial rotation structure via a second channel of a plastic barrel to rotate the adjustable lens element around its optical axis so as to accurately correct the assembling defects and the lens tilt.

Specifically, in the process of manufacturing the imaging lens assembly 300, a step of assembling the lens set 340 and the retaining element 370 into the plastic barrel 330 in order is performed first. The lens set 340 includes the one adjustable lens element 350 and a lens element 360 being not an adjustable lens element, and may further include at least another one optical element, e.g. another lens element being not an adjustable lens element, a spacer, a light blocking sheet and so on (not shown in drawings). A number of the second channel 332 of the plastic barrel 330 is one, and at least one of the axial rotation structures 352 is disposed correspondingly to the second channel 332 of the plastic barrel 330 and exposed. The retaining element 370 is disposed in the plastic barrel 330 and on an image side of the lens set 340. A lens gap between the adjustable lens element 350 and its adjacent lens element (e.g. the lens element 360) of the lens set 340 could be flexibly maintained by the retaining element 370, so that the adjustable lens element 350 assembled in the plastic barrel 330 is able to be rotated around the optical axis relative to the plastic barrel 330. Furthermore, surfaces facing each other of the adjustable lens element 350 and the adjacent lens element are smooth, so that the adjacent lens element would not be led to be rotated around the optical axis by the adjustable lens element 350 being rotated when the adjacent lens element contacts the adjustable lens element 350, as well as elements other than the adjustable lens element 350 of the imaging lens assembly 300 are also not led to be rotated around the optical axis by the adjustable lens element 350. The retaining element 370 may be fixedly connected to the plastic barrel 330 by directly dispensing a glue between thereof or by an anti-releasing structure to avoid the lens set 340 being released from the plastic barrel 330.

Then, the step of calibrating the adjustable lens element 350 by the external adjusting jig 380 is performed. One of the contact surfaces 382 directly contacts one surface of one of the axial rotation structures 352 via the second channel 332 to rotate the adjustable lens element 350 around the optical axis, and the optical data, e.g. images from the contrast examinations shown in FIG. 1F to FIG. 1K, of every of a plurality of rotational positions of the adjustable lens element 350 are measured and recorded. Next, one of the rotational positions corresponding to the best one among the optical data is determined as a fixed position of the adjustable lens element 350, and the adjustable lens element 350 is rotated and positioned to the fixed position so as to accurately correct the assembling defects and the lens tilt.

In FIG. 3A, the number of the contact surfaces 382 of the external adjusting jig 380 is twelve, and the number of the axial rotation structures 352 of the adjustable lens element 350 is twelve. The adjustable lens element 350 is led to be rotated around the optical axis by the external adjusting jig 380, which rotates (spins) around the central axis of the external adjusting jig 380 in the same time, wherein the twelve contact surfaces 382 contact the twelve axial rotation structures 352 one by one, so that the adjustable lens element 350 could be led to be rotated around the optical axis with a rotation angle of 360 degrees or being smaller than 360 degrees, e.g. 180 degrees, 90 degrees or any other degrees. Furthermore, the adjustable lens element 350 may be led to be rotated around the optical axis by the external adjusting jig 380, which displaces (e.g. has a revolution) in the same time, wherein at least one of the twelve contact surfaces 382 contacts at least one of the twelve axial rotation structures 352, so that the adjustable lens element 350 could be led to be rotated around the optical axis with a rotation angle of 360 degrees or being smaller than 360 degrees, e.g. 180 degrees, 90 degrees or any other degrees. Moreover, the adjustable lens element 350 may be led to be rotated around the optical axis by the external adjusting jig 380, which rotates and displaces alternately, or rotates and displaces simultaneously.

In addition, the adjustable lens element 350 may be led to be rotated clockwise or counterclockwise around the optical axis by the external adjusting jig 380, and the adjustable lens element 350 may be led to be rotated clockwise or counterclockwise alternately as needed. Accordingly, one of the rotational positions corresponding to the best one among the optical data is allowed to be determined as the fixed position of the adjustable lens element 350.

FIG. 3D is a schematic view of parameters of the imaging lens assembly 300 according to FIG. 3B. In FIG. 3D, when a length of each of the axial rotation structures 352 is d, and a width of the second channel 332 is w2, the following condition may be satisfied: d>w2. Therefore, it is favorable for improving the efficiency of rotating the adjustable lens element 350 by the external adjusting jig 380, and preventing the adjustable lens element 350 from being a tilt during rotating the adjustable lens element 350. Furthermore, it is favorable for obtaining an optimized image with a better image quality. The second channel 332 being wider allows the external adjusting jig with a more volume to contact the one of the axial rotation structures 352 so as to increase the calibration accuracy. In the 3rd embodiment, the parameter d is a length along a direction parallel to the optical axis of each of the axial rotation structures 352, and the parameter w2 is a length along the direction parallel to the optical axis of the second channel 332.

When the number of the axial rotation structures 352 of the adjustable lens element 350 is N, the following condition may be satisfied: 7<N<20. The axial rotation structures arranged too densely (the number N being overly large) or too sparsely (the number N being overly small) would affect the calibration efficiency by an external adjusting jig. In case the axial rotation structures are arranged too densely, the external adjusting jig having fine structures would be damaged more often. In case the axial rotation structures are arranged too sparsely, the calibration range would be limited or divided into separated sections, so that the external adjusting jig would be limited to find the axial rotation structures in small calibration ranges or under skipping a certain range. The adjustable lens element 350 satisfying the range of the number N is advantageous in effectively solving the problems mentioned in this paragraph.

In FIG. 3B to FIG. 3C, the plastic barrel 330 further includes an object-side surface 334, an object-side opening 333 and a tube portion 335, wherein the object-side surface 334 surrounds the object-side opening 333, the tube portion 335 is connected to the object-side surface 334 and disposed correspondingly to the object-side opening 333, and the second channel 332 disposed on the tube portion 335. Each of the axial rotation structures 352 is extended along the direction parallel to the optical axis, at least one of the axial rotation structures 352 is exposed via the second channel 332 in the opening type, and the at least one of the axial rotation structures 352 neither contacts the plastic barrel 330 nor enters into the second channel 332.

The data of the aforementioned parameters of the imaging lens assembly 300 manufactured by the external adjusting jig 380 according to the 3rd embodiment of the present disclosure are listed in the following Table 3, wherein the parameters are also shown as FIG. 3D.

TABLE 3

| 3rd Embodiment | | | |
|---|---|---|---|
| d (mm) | 2.45 | N | 12 |
| w2 (mm) | 1.75 | | |

4th Embodiment

Figure 4B:
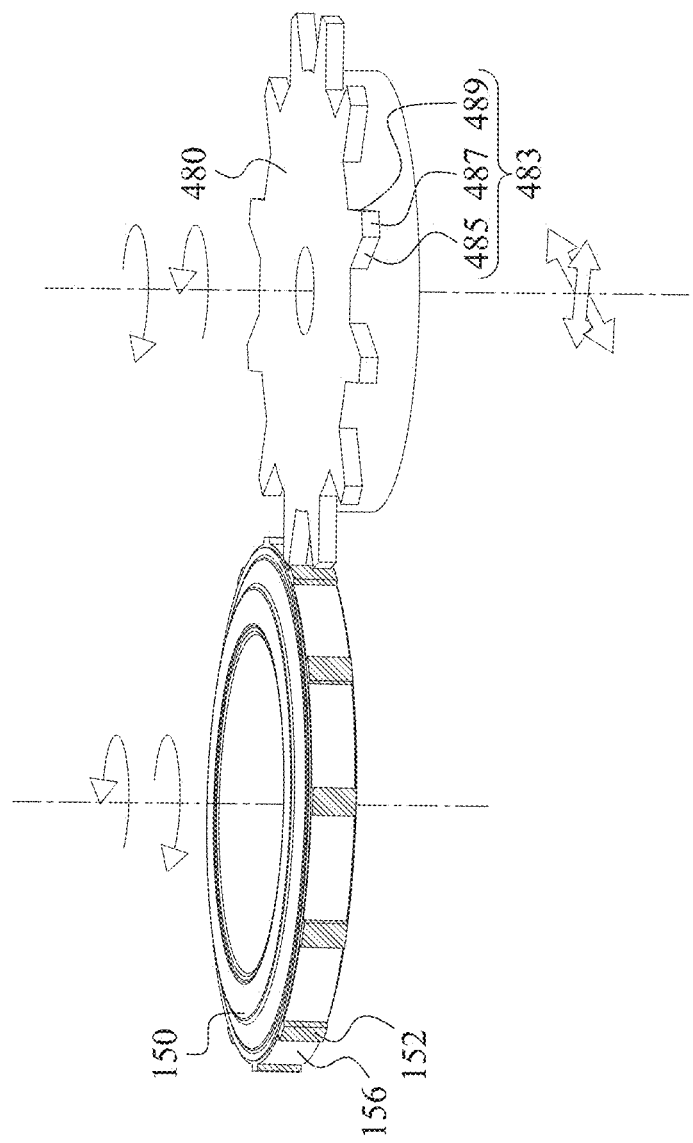
FIG. 4B is a schematic view of the external adjusting jig according to the 4th embodiment and the adjustable lens element of the imaging lens assembly according to FIG. 4A.

FIG. 4A is a schematic view of an external adjusting jig 480 according to the 4th embodiment of the present disclosure and the imaging lens assembly 100 in the 1st embodiment, and FIG. 4B is a schematic view of the external adjusting jig 480 according to the 4th embodiment and the adjustable lens element 150 of the imaging lens assembly 100 according to FIG. 4A. In FIG. 4A and FIG. 4B, the external adjusting jig 480 is able to be used in manufacturing the imaging lens assembly 100 in the 1st embodiment. Specifically, the imaging lens assembly 100 includes at least one adjustable lens element 150, and a process of manufacturing the imaging lens assembly 100 may include a step of calibrating the adjustable lens element 150 by the external adjusting jig 480.

In FIG. 1A, FIG. 1B, FIG. 4A and FIG. 4B, the imaging lens assembly 100 has the optical axis (its reference numeral is omitted) and includes the plastic barrel 130, the lens set 140 and the retaining element 170. The plastic barrel 130 includes the second channel 132, wherein the second channel 132 is an opening on the plastic barrel 130 and extended along the direction surrounding the optical axis. The lens set 140 is disposed in the plastic barrel 130 and includes the at least one adjustable lens element 150, wherein the outer diameter surface 156 of the adjustable lens element 150 includes the plurality of axial rotation structures 152, each of the axial rotation structures 152 is in the protruding strip shape, and at least one of the axial rotation structures 152 is disposed correspondingly to the second channel 132 of the plastic barrel 130 and exposed. The retaining element 170 is for avoiding the lens set 140 being released from the plastic barrel 130. The other details of the imaging lens assembly 100 have been described in the foregoing paragraphs of the 1st embodiment and will not be described again herein.

In FIG. 4A and FIG. 4B, the external adjusting jig 480 has a central axis (its reference numeral is omitted) and includes twelve tooth portions 483 regularly arranged with the same spacing along a direction surrounding the central axis, and the tooth portions 483 have the same or similar shapes and dimensions. Each of the tooth portions 483 includes tooth surfaces 485, 487 and 489, wherein one of the tooth surfaces 485, 487 and 489 is served as a contact surface of the external adjusting jig 480. In a process of manufacturing the imaging lens assembly 100, the contact surface directly contacts one of the axial rotation structures 152 via the second channel 132 of the plastic barrel 130 to rotate the adjustable lens element 150 around the optical axis relative to the plastic barrel 130.

Specifically, in the process of manufacturing the imaging lens assembly 100, a step of assembling the lens set 140 and the retaining element 170 into the plastic barrel 130 in order is performed first. The lens set 140 at least includes the one adjustable lens element 150 and the one lens element 160 being not an adjustable lens element. Each of the axial rotation structures 152 is in the protruding strip shape, and at least one of the axial rotation structures 152 is disposed correspondingly to the second channel 132 of the plastic barrel 130 and exposed. The retaining element 170 is disposed in the plastic barrel 130 and on the image side of the lens set 140. The lens gap between the adjustable lens element 150 and its adjacent lens element (e.g. the lens element 160) of the lens set 140 could be flexibly maintained by the retaining element 170, so that the adjustable lens element 150 assembled in the plastic barrel 130 is able to be rotated around the optical axis relative to the plastic barrel 130. Furthermore, surfaces facing each other of the adjustable lens element 150 and the adjacent lens element are smooth, so that the adjacent lens element would not be led to be rotated around the optical axis by the adjustable lens element 150 being rotated when the adjacent lens element contacts the adjustable lens element 150, as well as elements other than the adjustable lens element 150 of the imaging lens assembly 100 are also not led to be rotated around the optical axis by the adjustable lens element 150. Besides by the anti-releasing structure 171, the retaining element 170 may be fixedly connected to the plastic barrel 130 further by directly dispensing a glue between thereof to avoid the lens set 140 being released from the plastic barrel 130.

In addition, the number of the axial rotation structures 152 is twelve, wherein the axial rotation structures 152 in the protruding strip shapes have the same or similar shapes and dimensions, and the axial rotation structures 152 are arranged with the same spacing on the outer diameter surface 156 of the adjustable lens element 150 along the direction surrounding the optical axis. At least one surface of surfaces of the axial rotation structures 152 (e.g. the slash areas of the axial rotation structures 152 shown in FIG. 4A and FIG. 4B) and the contact surfaces of the external adjusting jig 480 may be processed by a surface machining process so as to increase a contact friction force between the axial rotation structures 152 and the contact surfaces of the external adjusting jig 480.

Then, a step of calibrating the adjustable lens element 150 by the external adjusting jig 480 is performed. One of the tooth surfaces 485, 487 and 489 being as the contact surface directly contacts and abuts one surface of one of the axial rotation structures 152 via the second channel 132 to rotate the adjustable lens element 150 around the optical axis. For example, in FIG. 4B, the tooth surface 489 is served as the contact surface, and directly contacts and abuts one of the axial rotation structures 152 to rotate the adjustable lens element 150 clockwise around the optical axis. The optical data, e.g. images from the contrast examinations shown in FIG. 1F to FIG. 1K, of every of a plurality of rotational positions of the adjustable lens element 150 are measured and recorded. Next, one of the rotational positions corresponding to the best one among the optical data is determined as a fixed position of the adjustable lens element 150, and the adjustable lens element 150 is rotated and positioned to the fixed position so as to accurately correct the assembling defects and the lens tilt.

More specifically, a number of the tooth portions 483 of the external adjusting jig 480 is twelve, and the number of the axial rotation structures 152 of the adjustable lens element 150 is twelve. The adjustable lens element 150 is led to be rotated around the optical axis by the external adjusting jig 480, which rotates (spins) around the central axis of the external adjusting jig 480 in the same time, wherein the twelve tooth portions 483 contact and abut the twelve axial rotation structures 152 one by one, so that the adjustable lens element 150 could be led to be rotated around the optical axis with a rotation angle equal to or smaller than 360 degrees. Furthermore, the adjustable lens element 150 may be led to be rotated around the optical axis by the external adjusting jig 480, which displaces (e.g. has a revolution) in the same time, wherein at least one of the twelve tooth portions 483 contacts and abuts at least one of the twelve axial rotation structures 152, so that the adjustable lens element 150 could be led to be rotated around the optical axis with a rotation angle equal to or smaller than 360 degrees. Moreover, the adjustable lens element 150 may be led to be rotated around the optical axis by the external adjusting jig 480, which rotates and displaces alternately, or rotates and displaces simultaneously.

Furthermore, the adjustable lens element 150 may be led to be rotated clockwise or counterclockwise around the optical axis by the external adjusting jig 480, and the adjustable lens element 150 may be led to be rotated clockwise or counterclockwise alternately as needed. Accordingly, one of the rotational positions corresponding to the best one among the optical data is allowed to be determined as the fixed position of the adjustable lens element 150.

In addition, the data of the parameters of the imaging lens assembly 100 manufactured by the external adjusting jig 480 according to the 4th embodiment of the present disclosure are listed in the aforementioned Table 1 in the 1st embodiment, and will not be described again herein.

5th Embodiment

Figure 5A:
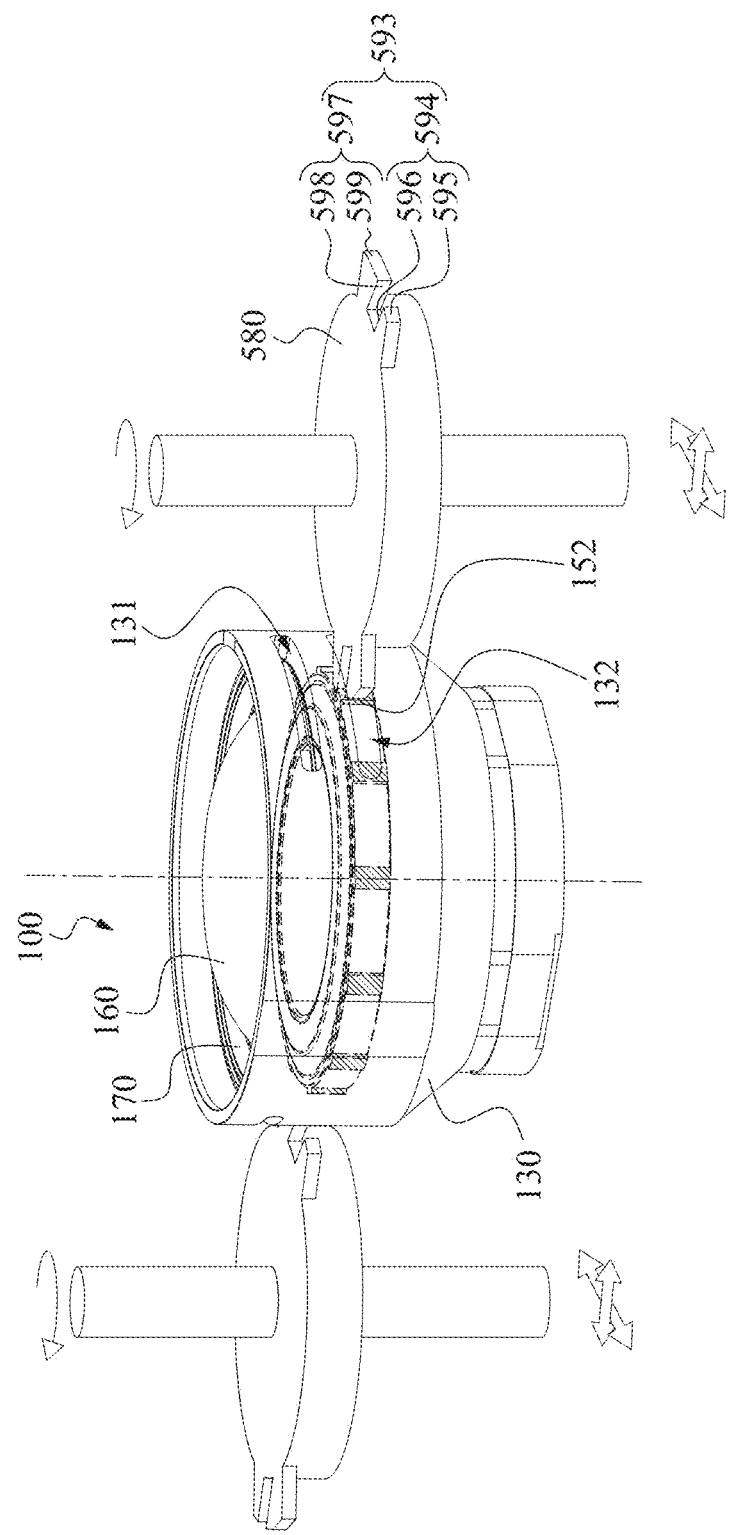
FIG. 5A is a schematic view of an external adjusting jig according to the 5th embodiment of the present disclosure and an imaging lens assembly.
Figure 5B:
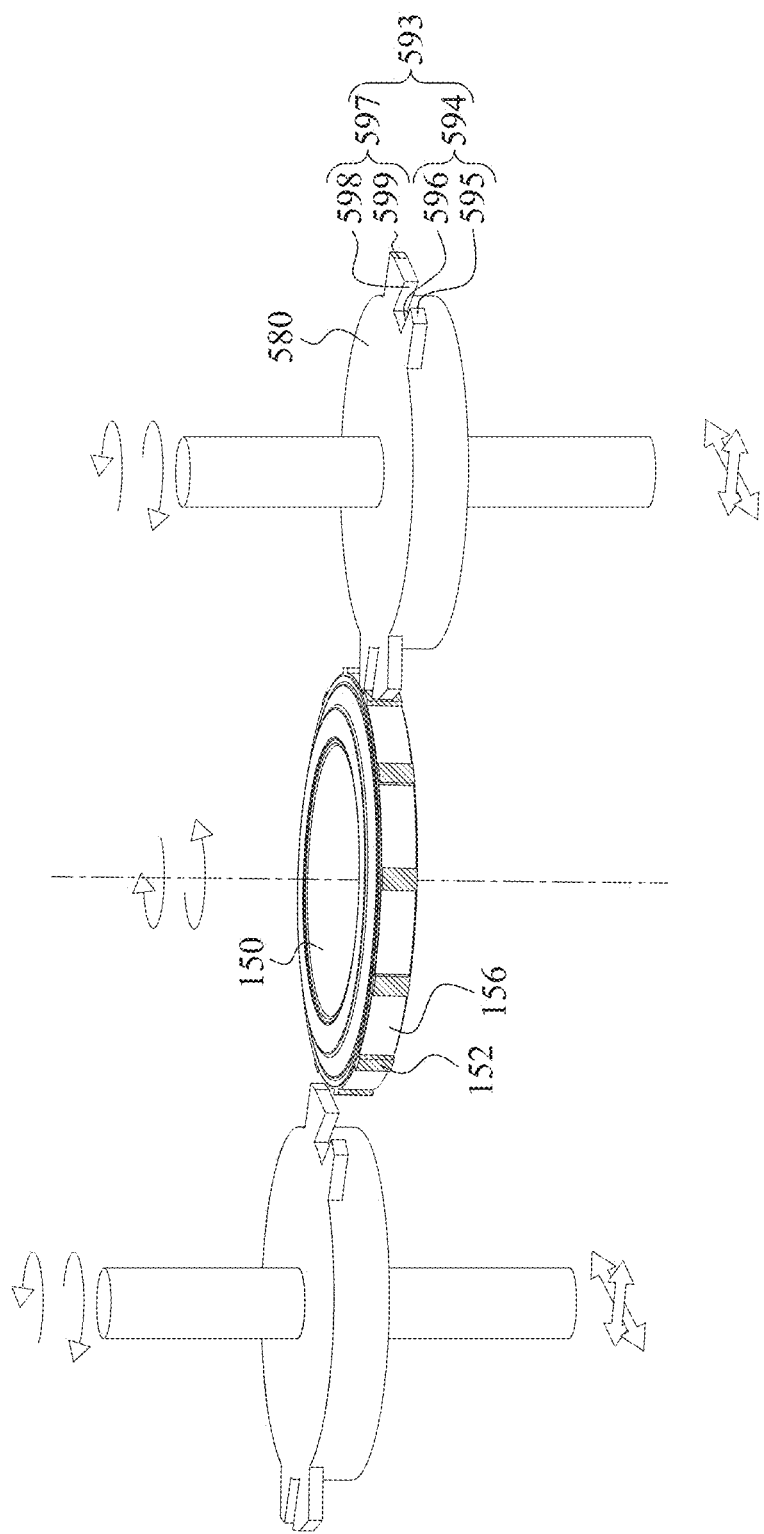
FIG. 5B is a schematic view of the external adjusting jig according to the 5th embodiment and the adjustable lens element of the imaging lens assembly according to FIG. 5A.

FIG. 5A is a schematic view of an external adjusting jig 580 according to the 5th embodiment of the present disclosure and the imaging lens assembly 100 in the 1st embodiment, and FIG. 5B is a schematic view of the external adjusting jig 580 according to the 5th embodiment and the adjustable lens element 150 of the imaging lens assembly 100 according to FIG. 5A. In FIG. 5A and FIG. 5B, the external adjusting jig 580 is able to be used in manufacturing the imaging lens assembly 100 in the 1st embodiment. Specifically, the imaging lens assembly 100 includes at least one adjustable lens element 150, and a process of manufacturing the imaging lens assembly 100 may include a step of calibrating the adjustable lens element 150 by the external adjusting jig 580.

In FIG. 1A, FIG. 1B, FIG. 5A and FIG. 5B, the imaging lens assembly 100 has the optical axis (its reference numeral is omitted) and includes the plastic barrel 130, the lens set 140 and the retaining element 170. The plastic barrel 130 includes the second channel 132, wherein the second channel 132 is an opening on the plastic barrel 130 and extended along the direction surrounding the optical axis. The lens set 140 is disposed in the plastic barrel 130 and includes the at least one adjustable lens element 150, wherein the outer diameter surface 156 of the adjustable lens element 150 includes the plurality of axial rotation structures 152, each of the axial rotation structures 152 is in the protruding strip shape, and at least one of the axial rotation structures 152 is disposed correspondingly to the second channel 132 of the plastic barrel 130 and exposed. The retaining element 170 is for avoiding the lens set 140 being released from the plastic barrel 130. The other details of the imaging lens assembly 100 have been described in the foregoing paragraphs of the 1st embodiment and will not be described again herein.

In FIG. 5A and FIG. 5B, a number of the external adjusting jig 580 may be one. The external adjusting jig 580 has a central axis (its reference numeral is omitted) and includes two clamp portions 593 arranged along a direction surrounding the central axis, and each of the clamp portions 593 includes clamp units 594 and 597. The clamp units 594 and 597 may have different shapes as shown in FIG. 5A and FIG. 5B, or the clamp units 594 and 597 may have the same shapes. The clamp unit 594 includes clamp surfaces 595 and 596, and the clamp unit 597 includes clamp surfaces 598 and 599. The clamp surfaces 596 and 598 facing each other are served as the contact surfaces, and the clamp surfaces 595 and 599 may also be served as the contact surfaces. In a process of manufacturing the imaging lens assembly 100, the contact surfaces directly contact one of the axial rotation structures 152 via the second channel 132 of the plastic barrel 130 to rotate the adjustable lens element 150 around the optical axis relative to the plastic barrel 130.

Specifically, in the process of manufacturing the imaging lens assembly 100, a step of assembling the lens set 140 and the retaining element 170 into the plastic barrel 130 in order is performed first. At least one surface of surfaces of the axial rotation structures 152 (e.g. the slash areas of the axial rotation structures 152 shown in FIG. 5A and FIG. 5B) and the contact surfaces of the external adjusting jig 580 may be processed by a surface machining process so as to increase a contact friction force between the axial rotation structures 152 and the contact surfaces of the external adjusting jig 580.

Then, a step of calibrating the adjustable lens element 150 by the external adjusting jig 580 is performed. The clamp surface 596 of the clamp unit 594 and the clamp surface 598 of the clamp unit 597 being as the contact surfaces directly contact and clamp one of the axial rotation structures 152 via the second channel 132 to rotate the adjustable lens element 150 around the optical axis. The optical data of every of a plurality of rotational positions of the adjustable lens element 150 are measured and recorded. Next, one of the rotational positions corresponding to the best one among the optical data is determined as a fixed position of the adjustable lens element 150, and the adjustable lens element 150 is rotated and positioned to the fixed position so as to accurately correct the assembling defects and the lens tilt.

More specifically, the adjustable lens element 150 may be led to be rotated around the optical axis by the external adjusting jig 580, which rotates (spins) or displaces (e.g. has a revolution), wherein the clamp surface 596 of the clamp unit 594 and the clamp surface 598 of the clamp unit 597 being as the contact surfaces directly contact and clamp one of the axial rotation structures 152, so that the adjustable lens element 150 could be led to be rotated around the optical axis with a rotation angle equal to or smaller than 360 degrees. Moreover, the adjustable lens element 150 may be led to be rotated around the optical axis by the external adjusting jig 580, which rotates and displaces alternately, or rotates and displaces simultaneously.

Furthermore, the adjustable lens element 150 may be led to be rotated clockwise or counterclockwise around the optical axis by the external adjusting jig 580, and the adjustable lens element 150 may be led to be rotated clockwise or counterclockwise alternately as needed. Accordingly, one of the rotational positions corresponding to the best one among the optical data is allowed to be determined as the fixed position of the adjustable lens element 150.

Moreover, in FIG. 5A and FIG. 5B, the number of the external adjusting jig 580 may be two, and the number of the second channel 132 may be two, wherein the two external adjusting jigs 580 are disposed correspondingly to the two second channels 132 respectively. The adjustable lens element 150 may be led to be rotated around the optical axis by the two external adjusting jigs 580 alternately or simultaneously with the aforementioned manners.

In a step of rotating the adjustable lens element 150 around the optical axis by the two external adjusting jigs 580 simultaneously, the two external adjusting jigs 580 may respectively clamp two of the axial rotation structures 152 in the protruding strip shapes of the adjustable lens element 150, and the adjustable lens element 150 is led to be rotated around the optical axis by the two external adjusting jigs 580, which both displace simultaneously. The two external adjusting jigs 580 may respectively clamp two of the axial rotation structures 152 in the protruding strip shapes of the adjustable lens element 150, and the adjustable lens element 150 is led to be more accurately rotated around the optical axis by the two external adjusting jigs 580, which both rotate (spin) in the same direction (i.e. one of clockwise and counterclockwise) simultaneously.

In addition, the data of the parameters of the imaging lens assembly 100 manufactured by the external adjusting jig 580 according to the 5th embodiment of the present disclosure are listed in the aforementioned Table 1 in the 1st embodiment, and will not be described again herein.

6th Embodiment

Figure 6:
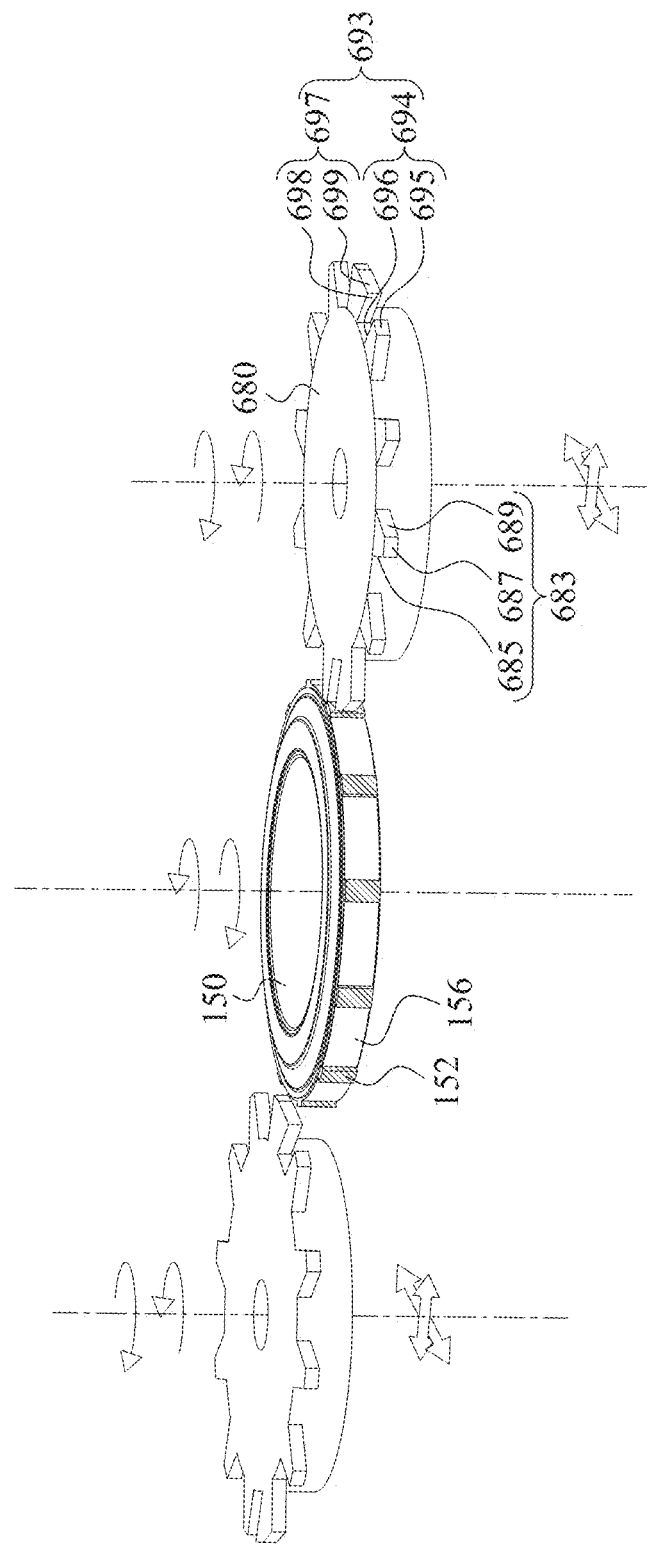
FIG. 6 is a schematic view of an external adjusting jig according to the 6th embodiment of the present disclosure and an adjustable lens element of an imaging lens assembly.

FIG. 6 is a schematic view of an external adjusting jig 680 according to the 6th embodiment of the present disclosure and the adjustable lens element 150 of the imaging lens assembly 100 in the 1st embodiment. In FIG. 6, the external adjusting jig 680 is able to be used in manufacturing the imaging lens assembly 100 in the 1st embodiment. Specifically, the imaging lens assembly 100 includes at least one adjustable lens element 150, and a process of manufacturing the imaging lens assembly 100 may include a step of calibrating the adjustable lens element 150 by the external adjusting jig 680.

In FIG. 1A, FIG. 1B and FIG. 6, the imaging lens assembly 100 has the optical axis (its reference numeral is omitted) and includes the plastic barrel 130, the lens set 140 and the retaining element 170. The plastic barrel 130 includes the second channel 132, wherein the second channel 132 is an opening on the plastic barrel 130 and extended along the direction surrounding the optical axis. The lens set 140 is disposed in the plastic barrel 130 and includes the at least one adjustable lens element 150, wherein the outer diameter surface 156 of the adjustable lens element 150 includes the plurality of axial rotation structures 152, each of the axial rotation structures 152 is in the protruding strip shape, and at least one of the axial rotation structures 152 is disposed correspondingly to the second channel 132 of the plastic barrel 130 and exposed. The retaining element 170 is for avoiding the lens set 140 being released from the plastic barrel 130. The other details of the imaging lens assembly 100 have been described in the foregoing paragraphs of the 1st embodiment and will not be described again herein.

In FIG. 1A and FIG. 6, a number of the external adjusting jig 680 may be one. The external adjusting jig 680 has a central axis (its reference numeral is omitted) and includes eight tooth portions 683 and two clamp portions 693 arranged along a direction surrounding the central axis, wherein one of the clamp portions 693 and four of the tooth portions 683 are arranged alternately. The eight tooth portions 683 have the same or similar shapes and dimensions, and each of the tooth portions 683 includes tooth surfaces 685, 687 and 689. Each of the clamp portions 693 includes clamp units 694 and 697. The clamp units 694 and 697 may have different shapes as shown in FIG. 6, or the clamp units 694 and 697 may have the same shapes. The clamp unit 694 includes clamp surfaces 695 and 696, and the clamp unit 697 includes clamp surfaces 698 and 699.

In a process of manufacturing the imaging lens assembly 100, when one of the tooth portions 683 is disposed correspondingly to the second channel 132 of the plastic barrel 130, one of the tooth surfaces 685, 687 and 689 of the one of the tooth portions 683 is served as a contact surface of the external adjusting jig 680, and the contact surface directly contacts one of the axial rotation structures 152 via the second channel 132 of the plastic barrel 130 to rotate the adjustable lens element 150 around the optical axis relative to the plastic barrel 130. In the process of manufacturing the imaging lens assembly 100, when one of the clamp portions 693 is disposed correspondingly to the second channel 132 of the plastic barrel 130, the clamp surfaces 696 and 698 facing each other of the one of the clamp portions 693 are served as contact surfaces of the external adjusting jig 680 (the clamp surfaces 695 and 699 of the one of the clamp portions 693 may be served as contact surfaces), and the contact surfaces directly contact one of the axial rotation structures 152 via the second channel 132 of the plastic barrel 130 to rotate the adjustable lens element 150 around the optical axis relative to the plastic barrel 130. Therefore, the external adjusting jig 680 is advantageous in more accurately leading the adjustable lens element 150 to rotate and increasing the manufacturing efficiency. Furthermore, elements other than the adjustable lens element 150 of the imaging lens assembly 100 are omitted in FIG. 6.

Specifically, in the process of manufacturing the imaging lens assembly 100, a step of assembling the lens set 140 and the retaining element 170 into the plastic barrel 130 in order is performed first. At least one surface of surfaces of the axial rotation structures 152 (e.g. the slash areas of the axial rotation structures 152 shown in FIG. 6) and the contact surfaces of the external adjusting jig 680 may be processed by a surface machining process so as to increase a contact friction force between the axial rotation structures 152 and the contact surfaces of the external adjusting jig 680.

Then, a step of calibrating the adjustable lens element 150 by the external adjusting jig 680 is performed. When one of the tooth portions 683 is disposed correspondingly to the second channel 132 of the plastic barrel 130, one of the tooth surfaces 685, 687 and 689 of the one of the tooth portions 683 is served as a contact surface of the external adjusting jig 680, and the contact surface directly contacts and abuts one of the axial rotation structures 152 via the second channel 132 of the plastic barrel 130 to rotate the adjustable lens element 150 around the optical axis relative to the plastic barrel 130. Accordingly, the adjustable lens element 150 is able to be rotated and positioned to a fixed position corresponding to the best or superior image quality so as to accurately correct the assembling defects and the lens tilt. The foregoing paragraphs about the external adjusting jig 480 in the 4th embodiment may be the reference to the other details of the tooth portions 683 of the external adjusting jig 680 leading the adjustable lens element 150 to rotate around the optical axis, which thereby will not be described again herein.

When one of the clamp portions 693 is disposed correspondingly to the second channel 132 of the plastic barrel 130, the clamp surfaces 696 and 698 of the one of the clamp portions 693 are served as contact surfaces of the external adjusting jig 680 (the clamp surfaces 695 and 699 of the one of the clamp portions 693 may be served as contact surfaces in another situation), and the contact surfaces directly contact and clamp one of the axial rotation structures 152 via the second channel 132 of the plastic barrel 130 to rotate the adjustable lens element 150 around the optical axis relative to the plastic barrel 130. Accordingly, the adjustable lens element 150 is able to be rotated and positioned to a fixed position corresponding to the best or superior image quality so as to accurately correct the assembling defects and the lens tilt. The foregoing paragraphs about the external adjusting jig 580 in the 5th embodiment may be the reference to the other details of the clamp portions 693 of the external adjusting jig 680 leading the adjustable lens element 150 to rotate around the optical axis, which thereby will not be described again herein.

Furthermore, in the step of calibrating the adjustable lens element 150 by the external adjusting jig 680, at least one of the tooth portions 683 and at least one of the clamp portions 693 of the one external adjusting jig 680 may alternately lead the adjustable lens element 150 to rotate around the optical axis, and thereby the adjustable lens element 150 is rotated and positioned to the fixed position corresponding to the best or superior image quality.

Moreover, in FIG. 6, the number of the external adjusting jig 680 may be two, and the number of the second channel 132 may be two, wherein the two external adjusting jigs 680 are disposed correspondingly to the two second channels 132 respectively. The adjustable lens element 150 may be led to be rotated around the optical axis by the two external adjusting jigs 680 alternately or simultaneously with the aforementioned manners.

In a step of rotating the adjustable lens element 150 around the optical axis by the two external adjusting jigs 680 simultaneously, two tooth portions 683 respectively of the two external adjusting jigs 680 may simultaneously abut two of the axial rotation structures 152 in the protruding strip shapes of the adjustable lens element 150, and the adjustable lens element 150 is led to be more accurately rotated around the optical axis by the two external adjusting jigs 680, which both rotate (spin) in the same direction simultaneously or displace simultaneously. Two clamp portions 693 respectively of the two external adjusting jigs 680 may simultaneously clamp two of the axial rotation structures 152 in the protruding strip shapes of the adjustable lens element 150, and the adjustable lens element 150 is led to be more accurately rotated around the optical axis by the two external adjusting jigs 680, which both rotate (spin) in the same direction simultaneously or displace simultaneously.

In addition, the data of the parameters of the imaging lens assembly 100 manufactured by the external adjusting jig 680 according to the 6th embodiment of the present disclosure are listed in the aforementioned Table 1 in the 1st embodiment, and will not be described again herein.

7th Embodiment

Figure 7A:
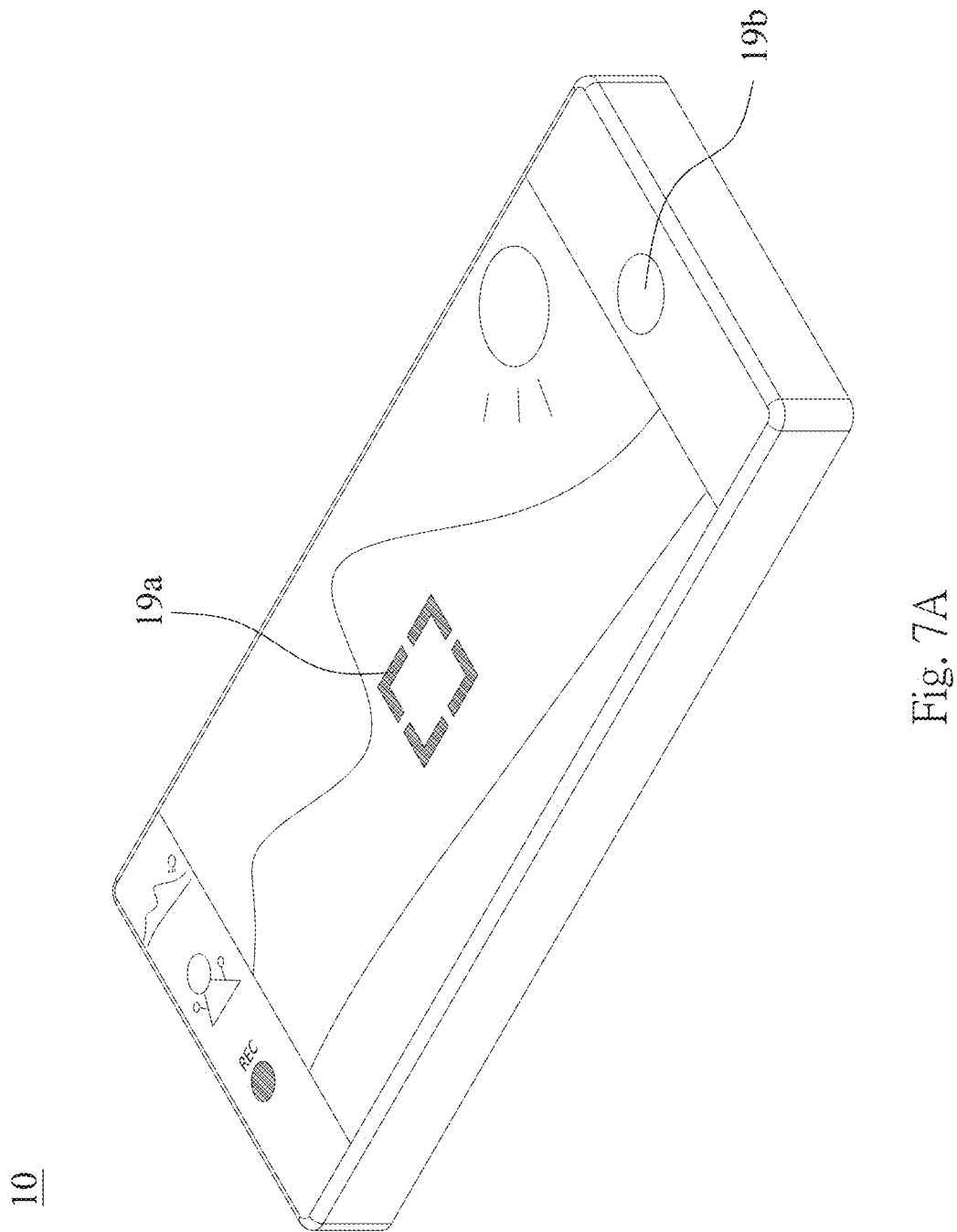
FIG. 7A shows a schematic view of an electronic device according to the 7th embodiment of the present disclosure.
Figure 7B:
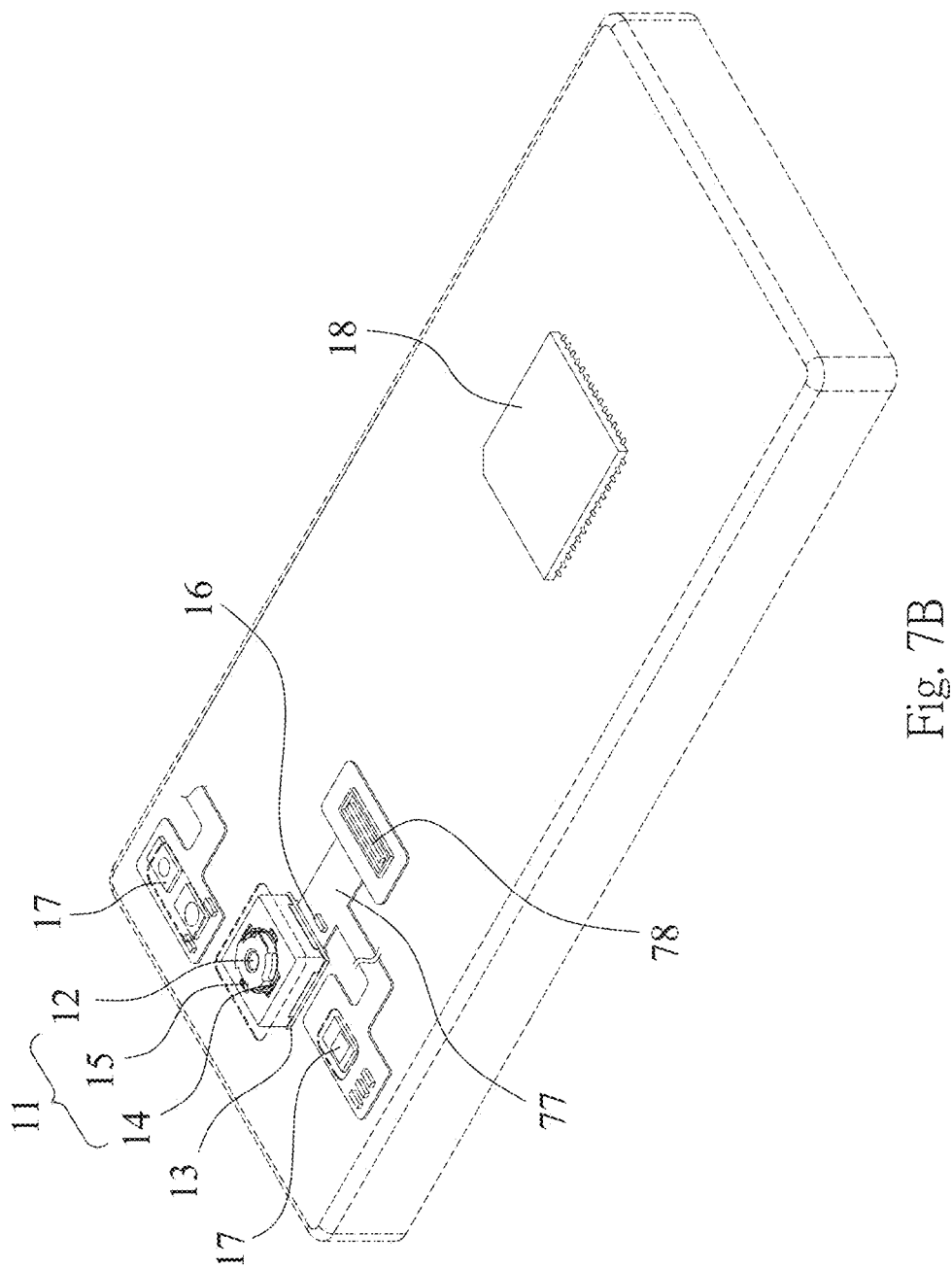
FIG. 7B shows another schematic view of the electronic device according to the 7th embodiment.

FIG. 7A shows a schematic view of an electronic device 10 according to the 7th embodiment of the present disclosure, FIG. 7B shows another schematic view of the electronic device 10 according to the 7th embodiment, and particularly, FIG. 7A and FIG. 7B are schematic views related to a camera of the electronic device 10. In FIG. 7A and FIG. 7B, the electronic device 10 of the 7th embodiment is a smart phone. The electronic device 10 includes a camera module 11 and an image sensor 13, wherein the camera module 11 includes an imaging lens assembly 12 according to the present disclosure, and the image sensor 13 is disposed on an image surface (not shown in drawings) of the camera module 11. Therefore, a better image quality can be achieved, and hence the high-end imaging requirements of modern electronic devices can be satisfied.

Furthermore, the user activates the capturing mode via a user interface 19 of the electronic device 10, wherein the user interface 19 of the 7th embodiment can be a touch screen 19a, a button 19b and etc. At this moment, the imaging light of the imaging lens assembly 12 is converged on the image sensor 13, and the electronic signal associated with image is output to an image signal processor (ISP) 18.

Figure 7C:
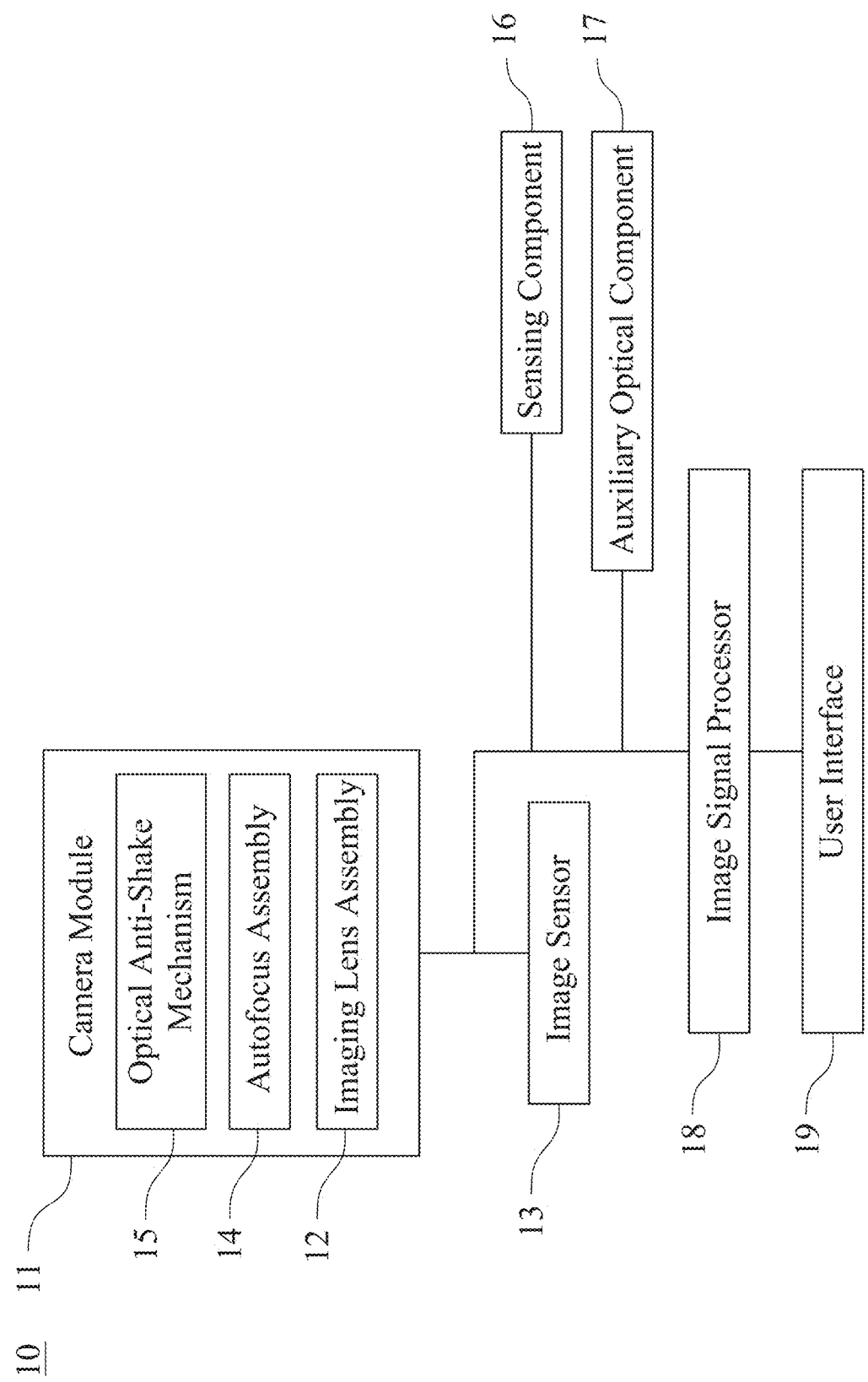
FIG. 7C shows a block diagram of the electronic device according to the 7th embodiment.

FIG. 7C shows a block diagram of the electronic device 10 according to the 7th embodiment, and in particular, the block diagram is related to the camera of the electronic device 10. In FIG. 7A to FIG. 7C, the camera module 11 can further include an autofocus assembly 14 and an optical anti-shake mechanism 15 based on the camera specification of the electronic device 10. Moreover, the electronic device 10 can further include at least one auxiliary optical component 17 and at least one sensing component 16. The auxiliary optical component 17 can be a flash module for compensating for the color temperature, an infrared distance measurement component, a laser focus module and etc. The sensing component 16 can have functions for sensing physical momentum and kinetic energy, and thereby can be an accelerator, a gyroscope, and a Hall effect element, to sense shaking or jitters applied by hands of the user or external environments. Accordingly, the functions of the autofocus assembly 14 and the optical anti-shake mechanism 15 of the camera module 11 can be aided and enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 7B, the camera module 11, the sensing component 16 and the auxiliary optical component 17 can be disposed on a flexible printed circuit board (FPC) 77 and electrically connected with the associated components, such as the imaging signal processor 18, via a connector 78 to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. In the 7th embodiment, the electronic device 10 includes a plurality of sensing components 16 and a plurality of auxiliary optical components 17. The sensing components 16 and the auxiliary optical components 17 are disposed on the flexible printed circuit board 77 and at least one other flexible printed circuit board (its reference numeral is omitted) and electrically connected with the associated components, such as the image signal processor 18, via corresponding connectors to perform the capturing process. In other embodiments (not shown herein), the sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory, or a combination thereof.

8th Embodiment

Figure 8:
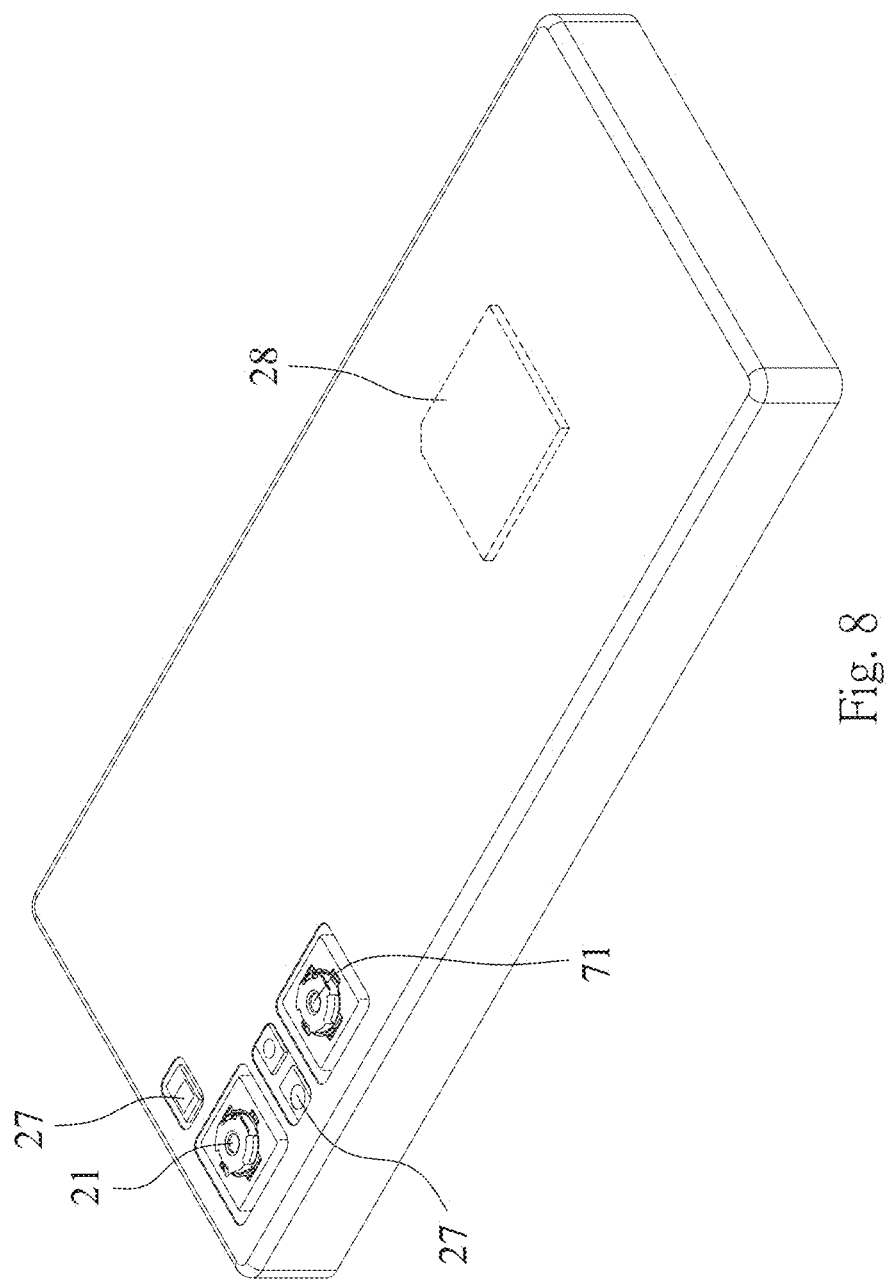
FIG. 8 shows an electronic device according to the 8th embodiment of the present disclosure.

FIG. 8 shows an electronic device 20 according to the 8th embodiment of the present disclosure. The electronic device 20 of the 8th embodiment is a smart phone. The electronic device 20 includes camera modules 21, 71 and two image sensors (not shown in drawings) respectively corresponding to thereof. The camera module 21 includes an imaging lens assembly (not shown in drawings), and the corresponding image sensor is disposed on an image surface of the camera module 21. The camera module 71 includes an imaging lens assembly (not shown in drawings), and the corresponding image sensor is disposed on an image surface of the camera module 71.

Furthermore, at least one of the imaging lens assembly of the camera module 21 and the imaging lens assembly of the camera module 71 is an imaging lens assembly according to the present disclosure, and the two imaging lens assemblies may not have the same optical properties. In the photographing procedure of the electronic device 20, two images can be captured by the camera modules 21 and 71 with an aid of an auxiliary optical component 27, and then the required effects like zooming, delicate images would be achieved by the processors (such as an image signal processor 28 and so on) equipped in the electronic device 20.

9th Embodiment

Figure 9:
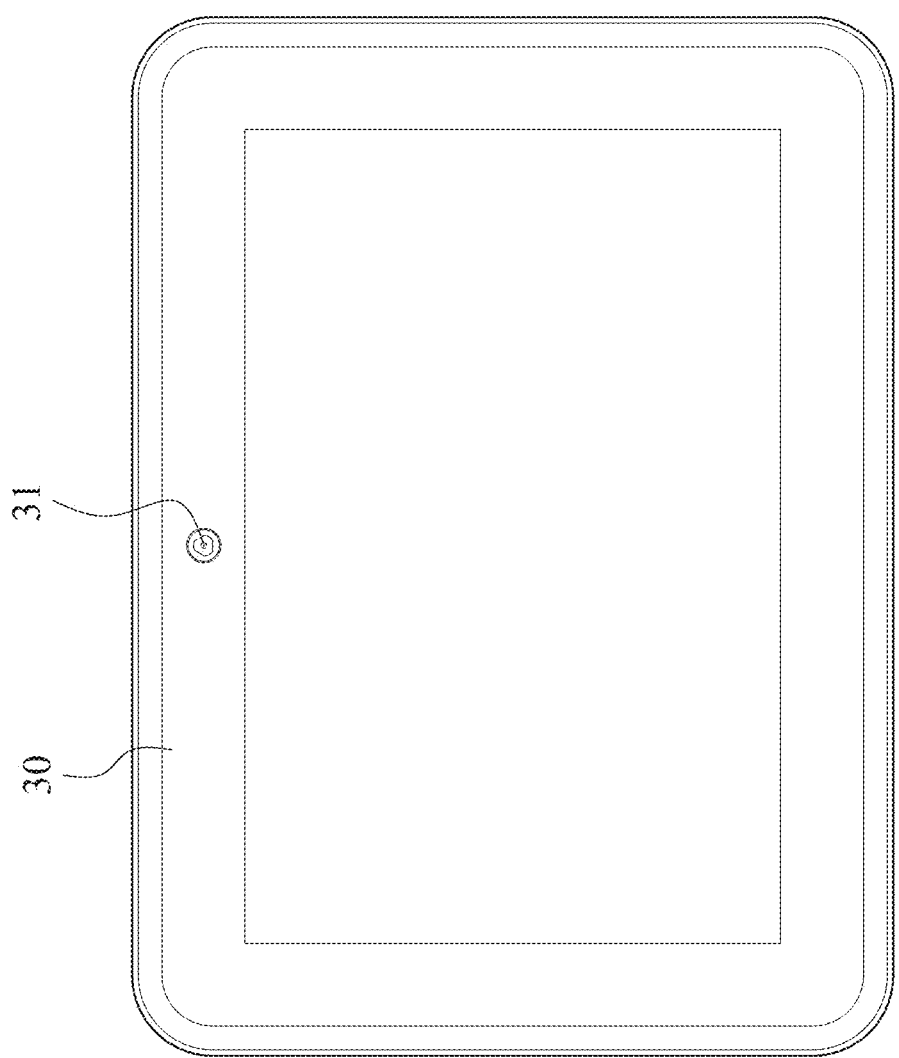
FIG. 9 shows an electronic device according to the 9th embodiment of the present disclosure.

FIG. 9 shows an electronic device 30 according to the 9th embodiment of the present disclosure. The electronic device 30 of the 9th embodiment is a tablet personal computer. The electronic device 30 includes a camera module 31 and an image sensor (not shown in drawings), wherein the camera module 31 includes an imaging lens assembly (not shown in drawings) according to the present disclosure, and the image sensor is disposed on an image surface of the camera module 31.

10th Embodiment

FIG. 10 shows an electronic device 40 according to the 10th embodiment of the present disclosure. The electronic device 40 of the 10th embodiment is a wearable device. The electronic device 40 includes a camera module 41 and an image sensor (not shown in drawings), wherein the camera module 41 includes an imaging lens assembly (not shown in drawings) according to the present disclosure, and the image sensor is disposed on an image surface of the camera module 41.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, having an optical axis and comprising:
   a plastic barrel comprising a first channel and a second channel, wherein the first channel is extended along a direction surrounding the optical axis, and the second channel is an opening on the plastic barrel;

a lens set disposed in the plastic barrel and comprising at least one adjustable lens element, wherein an outer diameter surface of the adjustable lens element comprises a plurality of axial rotation structures, each of the axial rotation structures is in a protruding strip shape, and at least one of the axial rotation structures is disposed correspondingly to the second channel of the plastic barrel and exposed; and a retaining element disposed in the plastic barrel and comprising an anti-releasing structure, which is disposed correspondingly to the first channel of the plastic barrel to avoid the lens set being released from the plastic barrel.

2. The imaging lens assembly of claim 1, wherein the first channel is another opening on the plastic barrel, and the anti-releasing structure is disposed correspondingly to the first channel of the plastic barrel and exposed.

3. The imaging lens assembly of claim 2, wherein each of the axial rotation structures is extended along a direction parallel to the optical axis.

4. The imaging lens assembly of claim 2, wherein a number of the axial rotation structures is N, and the following condition is satisfied:

$7<N<20.$

5. The imaging lens assembly of claim 3, wherein the plastic barrel further comprises:
an object-side surface;
an object-side opening, wherein the object-side surface surrounds the object-side opening; and
a tube portion connected to the object-side surface and disposed correspondingly to the object-side opening, wherein the first channel and the second channel are both disposed on the tube portion.

6. The imaging lens assembly of claim 3, wherein the second channel is extended along the direction surrounding the optical axis.

7. The imaging lens assembly of claim 6, wherein a length of each of the axial rotation structures is d, a width of the second channel is w2, and the following condition is satisfied:

$d>w2.$

8. The imaging lens assembly of claim 3, wherein the anti-releasing structure is disposed on an outer diameter surface of the retaining element and extended along the direction surrounding the optical axis.

9. A camera module, comprising:
the imaging lens assembly of claim 1.

10. An electronic device, comprising:
the camera module of claim 9; and
an image sensor disposed on an image surface of the camera module.

11. An imaging lens assembly, having an optical axis and comprising:
a plastic barrel comprising a first channel and a second channel, wherein the second channel is an opening on the plastic barrel and extended along a direction surrounding the optical axis;
a lens set disposed in the plastic barrel and comprising at least one adjustable lens element, wherein an outer diameter surface of the adjustable lens element comprises a plurality of axial rotation structures, each of the axial rotation structures is in a protruding strip shape and extended along a direction parallel to the optical axis, and at least one of the axial rotation structures is disposed correspondingly to the second channel of the plastic barrel and exposed; and
a retaining element disposed in the plastic barrel and comprising an anti-releasing structure, which is disposed correspondingly to the first channel of the plastic barrel to avoid the lens set being released from the plastic barrel.

12. The imaging lens assembly of claim 11, wherein the plastic barrel further comprises:
an object-side surface;
an object-side opening, wherein the object-side surface surrounds the object-side opening; and
a tube portion connected to the object-side surface and disposed correspondingly to the object-side opening, wherein the first channel and the second channel are both disposed on the tube portion.

13. The imaging lens assembly of claim 11, wherein a number of the axial rotation structures is N, and the following condition is satisfied:

$7<N<20.$

14. The imaging lens assembly of claim 11, wherein the anti-releasing structure is disposed on an outer diameter surface of the retaining element and extended along the direction surrounding the optical axis.

15. The imaging lens assembly of claim 11, wherein the first channel is extended along the direction surrounding the optical axis, a width of the first channel is w1, a width of the second channel is w2, and the following condition is satisfied:

$0.6<w1/w2<1.6.$

16. A camera module, comprising:
the imaging lens assembly of claim 11.

17. An electronic device, comprising:
the camera module of claim 16; and
an image sensor disposed on an image surface of the camera module.

* * * * *